(12) United States Patent
Fujita et al.

(10) Patent No.: US 10,926,836 B2
(45) Date of Patent: Feb. 23, 2021

(54) BICYCLE REAR SPROCKET ASSEMBLY

(71) Applicant: SHIMANO INC., Sakai (JP)

(72) Inventors: Hiroshi Fujita, Sakai (JP); Atsuhiro Emura, Sakai (JP); Yasufumi Fukunaga, Sakai (JP); Tsuyoshi Fukumori, Sakai (JP)

(73) Assignee: SHIMANO INC., Sakai (JP)

( * ) Notice: Subject to any disclaimer, the term of this patent is extended or adjusted under 35 U.S.C. 154(b) by 243 days.

(21) Appl. No.: 15/686,113

(22) Filed: Aug. 24, 2017

(65) Prior Publication Data

US 2019/0061873 A1    Feb. 28, 2019

(51) Int. Cl.
| | |
|---|---|
| *B62M 9/10* | (2006.01) |
| *B60B 27/04* | (2006.01) |
| *F16H 55/30* | (2006.01) |
| *B60B 27/02* | (2006.01) |

(52) U.S. Cl.
CPC ............... *B62M 9/10* (2013.01); *B60B 27/04* (2013.01); *B60B 27/047* (2013.01); *F16H 55/30* (2013.01); *B60B 27/023* (2013.01)

(58) Field of Classification Search
CPC .......... B62M 9/10; B62M 9/12; B62M 9/105; B62M 2009/007; F16H 55/30
USPC ........................................................ 474/160
See application file for complete search history.

(56) References Cited

U.S. PATENT DOCUMENTS

| | | | | |
|---|---|---|---|---|
| 4,198,876 A | * | 4/1980 | Nagano | B62M 9/10 474/160 |
| 5,514,042 A | * | 5/1996 | Liou | B62M 9/10 474/160 |
| 5,954,604 A | * | 9/1999 | Nakamura | B62M 9/10 474/158 |
| 6,013,001 A | * | 1/2000 | Miyoshi | B62M 9/10 474/156 |
| 6,264,575 B1 | * | 7/2001 | Lim | B62M 9/10 192/64 |
| 6,340,338 B1 | * | 1/2002 | Kamada | B62M 9/10 474/152 |
| 6,923,741 B2 | * | 8/2005 | Wei | B62M 9/10 474/152 |

(Continued)

FOREIGN PATENT DOCUMENTS

| | | |
|---|---|---|
| CN | 203740093 U | 7/2014 |
| CN | 105799856 | 7/2016 |

*Primary Examiner* — Henry Y Liu
(74) *Attorney, Agent, or Firm* — Mori & Ward, LLP

(57) ABSTRACT

A bicycle rear sprocket assembly comprises a sprocket support and a first sprocket. The sprocket support includes a hub engagement part configured to engage with a bicycle hub assembly. The sprocket support includes a plurality of sprocket attachment members extending radially outwardly from the hub engagement part with respect to a rotational center axis of the bicycle rear sprocket assembly. The first sprocket is attached to the plurality of sprocket attachment members. The first sprocket includes a first sprocket body and a plurality of first sprocket teeth which extends radially outwardly from the first sprocket body with respect to the rotational center axis and a total number of which is equal to or larger than thirty-four. The first sprocket has a plurality of shifting facilitation areas. A total number of the plurality of shifting facilitation areas is a divisor of a total number of the plurality of sprocket attachment members.

18 Claims, 18 Drawing Sheets

(56) References Cited

U.S. PATENT DOCUMENTS

| | | | | |
|---|---|---|---|---|
| 7,871,347 B2* | 1/2011 | Kamada | ............... | B62M 9/10 474/152 |
| 7,959,529 B2* | 6/2011 | Braedt | ............... | B62M 9/10 474/152 |
| 8,057,338 B2* | 11/2011 | Kamada | ............... | B62M 9/10 474/152 |
| 8,092,329 B2* | 1/2012 | Wickliffe | ............... | B62M 9/105 474/160 |
| 8,100,795 B2* | 1/2012 | Reiter | ............... | B62M 9/10 474/160 |
| 8,550,944 B2* | 10/2013 | Esquibel | ............... | B62M 9/10 474/160 |
| 8,573,093 B2* | 11/2013 | Valle | ............... | B62M 3/00 474/160 |
| 8,617,015 B2* | 12/2013 | Wickliffe | ............... | F16H 55/30 474/160 |
| 8,663,044 B2* | 3/2014 | Lin | ............... | B62M 9/10 474/160 |
| 8,696,503 B2* | 4/2014 | Oishi | ............... | B62M 9/10 474/160 |
| 8,764,594 B2* | 7/2014 | Dal Pra' | ............... | F16H 55/30 474/160 |
| 8,821,330 B2* | 9/2014 | Dal Pra' | ............... | B62M 9/10 474/160 |
| 8,905,878 B2* | 12/2014 | Loy | ............... | B62M 9/10 474/160 |
| 8,911,314 B2* | 12/2014 | Braedt | ............... | B62M 9/10 474/160 |
| 8,956,254 B2* | 2/2015 | Tokuyama | ............... | B62M 9/12 474/160 |
| 8,968,130 B2* | 3/2015 | Liao | ............... | B62M 9/10 474/160 |
| 9,011,282 B2* | 4/2015 | Staples | ............... | B62M 9/12 474/160 |
| 2005/0272546 A1* | 12/2005 | Reiter | ............... | B62M 9/10 474/152 |
| 2013/0035183 A1* | 2/2013 | Tokuyama | ............... | B62M 9/10 474/78 |
| 2015/0080160 A1* | 3/2015 | Staples | ............... | B62M 9/10 474/160 |
| 2016/0207590 A1 | 7/2016 | Fukumori | | |

* cited by examiner

BICYCLE REAR SPROCKET ASSEMBLY

BACKGROUND OF THE INVENTION

Field of the Invention

The present invention relates to a bicycle rear sprocket assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle rear sprocket assembly.

SUMMARY OF THE INVENTION

In accordance with a first aspect of the present invention, a bicycle rear sprocket assembly comprises a sprocket support and a first sprocket. The sprocket support includes a hub engagement part configured to engage with a bicycle hub assembly. The sprocket support includes a plurality of sprocket attachment members extending radially outwardly from the hub engagement part with respect to a rotational center axis of the bicycle rear sprocket assembly. The first sprocket is attached to the plurality of sprocket attachment members. The first sprocket includes a first sprocket body and a plurality of first sprocket teeth which extend radially outwardly from the first sprocket body with respect to the rotational center axis and a total number of which is equal to or larger than thirty-four. The first sprocket has a plurality of shifting facilitation areas. A total number of the plurality of shifting facilitation areas is a divisor of a total number of the plurality of sprocket attachment members.

With the bicycle rear sprocket assembly according to the first aspect, it is possible to save weight of the bicycle rear sprocket assembly without reducing rigidity of the sprocket support.

In accordance with a second aspect of the present invention, a bicycle rear sprocket assembly comprises a sprocket support and a first sprocket. The sprocket support includes a hub engagement part configured to engage with a bicycle hub assembly. The sprocket support includes a plurality of sprocket attachment members extending radially outwardly from the hub engagement part with respect to a rotational center axis of the bicycle rear sprocket assembly. A total number of the plurality of sprocket attachment members is equal to or larger than six. The first sprocket is attached to the plurality of sprocket attachment members. The first sprocket includes a first sprocket body and a plurality of first sprocket teeth extending radially outwardly from the first sprocket body with respect to the rotational center axis. The first sprocket has more than two shifting facilitation areas. A total number of the shifting facilitation areas is a divisor of a total number of the plurality of sprocket attachment members.

With the bicycle rear sprocket assembly according to the second aspect, it is possible to save weight of the bicycle rear sprocket assembly without reducing rigidity of the sprocket support.

In accordance with a third aspect of the present invention, the bicycle rear sprocket assembly according to the first aspect is configured so that a total number of the plurality of sprocket attachment members is equal to or larger than six.

With the bicycle rear sprocket assembly according to the third aspect, it is possible to enhance rigidity of the sprocket support.

In accordance with a fourth aspect of the present invention, the bicycle rear sprocket assembly according to any one of the first to third aspects is configured so that a total number of the plurality of sprocket attachment members is equal to six. The first sprocket has three or six shifting facilitation areas.

With the bicycle rear sprocket assembly according to the fourth aspect, it is possible to perform shifting flexibly.

In accordance with a fifth aspect of the present invention, the bicycle rear sprocket assembly according to any one of the first to fourth aspects is configured so that the shifting facilitation areas include at least one of at least one upshifting facilitation area and at least one downshifting facilitation area.

With the bicycle rear sprocket assembly according to the fifth aspect, it is possible to perform at least one of upshifting and downshifting smoothly.

In accordance with a sixth aspect of the present invention, the bicycle rear sprocket assembly according to any one of the first to fifth aspects is configured so that the first sprocket is attached to the plurality of sprocket attachment members via adhesive.

With the bicycle rear sprocket assembly according to the sixth aspect, it is possible to save weight of the bicycle rear sprocket assembly with maintaining or improving coupling strength between the first sprocket and the plurality of sprocket attachment members.

In accordance with a seventh aspect of the present invention, the bicycle rear sprocket assembly according to any one of the first to sixth aspects is configured so that the sprocket support includes a plurality of support arms extending radially outwardly from the hub engagement part. The first sprocket is attached to the plurality of support arms.

With the bicycle rear sprocket assembly according to the seventh aspect, it is possible to maintain or improve rigidity of the sprocket support with simple structure.

In accordance with an eighth aspect of the present invention, the bicycle rear sprocket assembly according to any one of the first to seventh aspects is configured so that at least one of the plurality of sprocket attachment members includes a first radial support surface and a first axial support surface. The first radial support surface faces radially outwardly. The first axial support surface faces in an axial direction. The first sprocket is attached to the first radial support surface and the first axial support surface.

With the bicycle rear sprocket assembly according to the eighth aspect, it is possible to increase an area of a surface coupling the first sprocket to the sprocket attachment members.

In accordance with a ninth aspect of the present invention, the bicycle rear sprocket assembly according to any one of the first to eighth aspects is configured so that the sprocket support is made of resin.

With the bicycle rear sprocket assembly according to the ninth aspect, it is possible to save weight of the sprocket support.

In accordance with a tenth aspect of the present invention, the bicycle rear sprocket assembly according to any one of the first to eighth aspects is configured so that the first sprocket is made of a metallic material.

With the bicycle rear sprocket assembly according to the tenth aspect, it is possible to improve strength of the first sprocket.

In accordance with an eleventh aspect of the present invention, the bicycle rear sprocket assembly according to the tenth aspect is configured so that the first sprocket is made of aluminum.

With the bicycle rear sprocket assembly according to the eleventh aspect, it is possible to improve strength of the first sprocket with saving weight of the first sprocket In accordance with a twelfth aspect of the present invention, the bicycle rear sprocket assembly according to any one of the first to eleventh aspects further comprises a second sprocket, a third sprocket, and a fourth sprocket. The second sprocket includes a second sprocket body and a plurality of second sprocket teeth extending radially outwardly from the second sprocket body with respect to the rotational center axis. The third sprocket includes a third sprocket body and a plurality of third sprocket teeth extending radially outwardly from the third sprocket body with respect to the rotational center axis. The fourth sprocket includes a fourth sprocket body and a plurality of fourth sprocket teeth extending radially outwardly from the fourth sprocket body with respect to the rotational center axis.

With the bicycle rear sprocket assembly according to the twelfth aspect, it is possible to mount at least four sprockets to the bicycle rear sprocket assembly.

In accordance with a thirteenth aspect of the present invention, the bicycle rear sprocket assembly according to the twelfth aspect is configured so that the second sprocket, the third sprocket, and the fourth sprocket are attached to the plurality of sprocket attachment members.

With the bicycle rear sprocket assembly according to the thirteenth aspect, it is possible to effectively mount at least four sprockets to the sprocket support.

In accordance with a fourteenth aspect of the present invention, the bicycle rear sprocket assembly according to any one of the first to thirteenth aspects is configured so that the first sprocket has a first pitch-circle diameter. The first pitch-circle diameter is the largest pitch-circle diameter in the bicycle rear sprocket assembly.

With the bicycle rear sprocket assembly according to the fourteenth aspect, it is possible to save weight of the bicycle rear sprocket assembly including the largest sprocket without reducing rigidity of the sprocket support.

In accordance with a fifteenth aspect of the present invention, the bicycle rear sprocket assembly according to any one of the first to fourteenth aspects is configured so that the hub engagement part includes at least one spline configured to engage with the bicycle hub assembly.

With the bicycle rear sprocket assembly according to the fifteenth aspect, it is possible to mount the bicycle rear sprocket assembly to the bicycle hub assembly having a spline.

In accordance with a sixteenth aspect of the present invention, the bicycle rear sprocket assembly according to any one of the first to fifteenth aspects is configured so that the first sprocket has an axial outward surface and an axial inward surface which is a reverse surface of the axial outward surface along the rotational center axis of the bicycle rear sprocket assembly. The first axial recesses are provided on the axial outward surface in the shifting facilitation areas. At least one second axial recess is provided on the axial inward surface in the at least one upshifting facilitation area.

With the bicycle rear sprocket assembly according to the sixteenth aspect, it is possible to further perform upshifting and downshifting smoothly.

In accordance with a seventeenth aspect of the present invention, the bicycle rear sprocket assembly according to any one of the first to sixteenth aspects is configured so that at least one of the plurality of shifting facilitation areas is overlapped with one of the plurality of sprocket attachment members.

With the bicycle rear sprocket assembly according to the seventeenth aspect, it is possible to maintain or improve rigidity of the sprocket support for shifting.

In accordance with an eighteen aspect of the present invention, the bicycle rear sprocket assembly according to the seventeenth aspect is configured so that each of the plurality of shifting facilitation areas is overlapped with each of the plurality of sprocket attachment members.

With the bicycle rear sprocket assembly according to the eighteenth aspect, it is possible to maintain or improve rigidity of the sprocket support for shifting.

In accordance with a nineteenth aspect of the present invention, the bicycle rear sprocket assembly according to any one of the first to eighteenth aspects is configured so that at least one of the plurality of shifting facilitation areas is positioned between adjacent two of the plurality of sprocket attachment members.

With the bicycle rear sprocket assembly according to the nineteenth aspect, it is possible to perform shifting flexibly.

In accordance with a twentieth aspect of the present invention, the bicycle rear sprocket assembly according to the nineteenth aspect is configured so that each of the plurality of shifting facilitation areas is positioned between adjacent two of the plurality of sprocket attachment members.

With the bicycle rear sprocket assembly according to the twentieth aspect, it is possible to substantially equalize forces applied to respective sprocket attachment members. Accordingly, it is possible to maintain or improve rigidity of the sprocket support for shifting.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
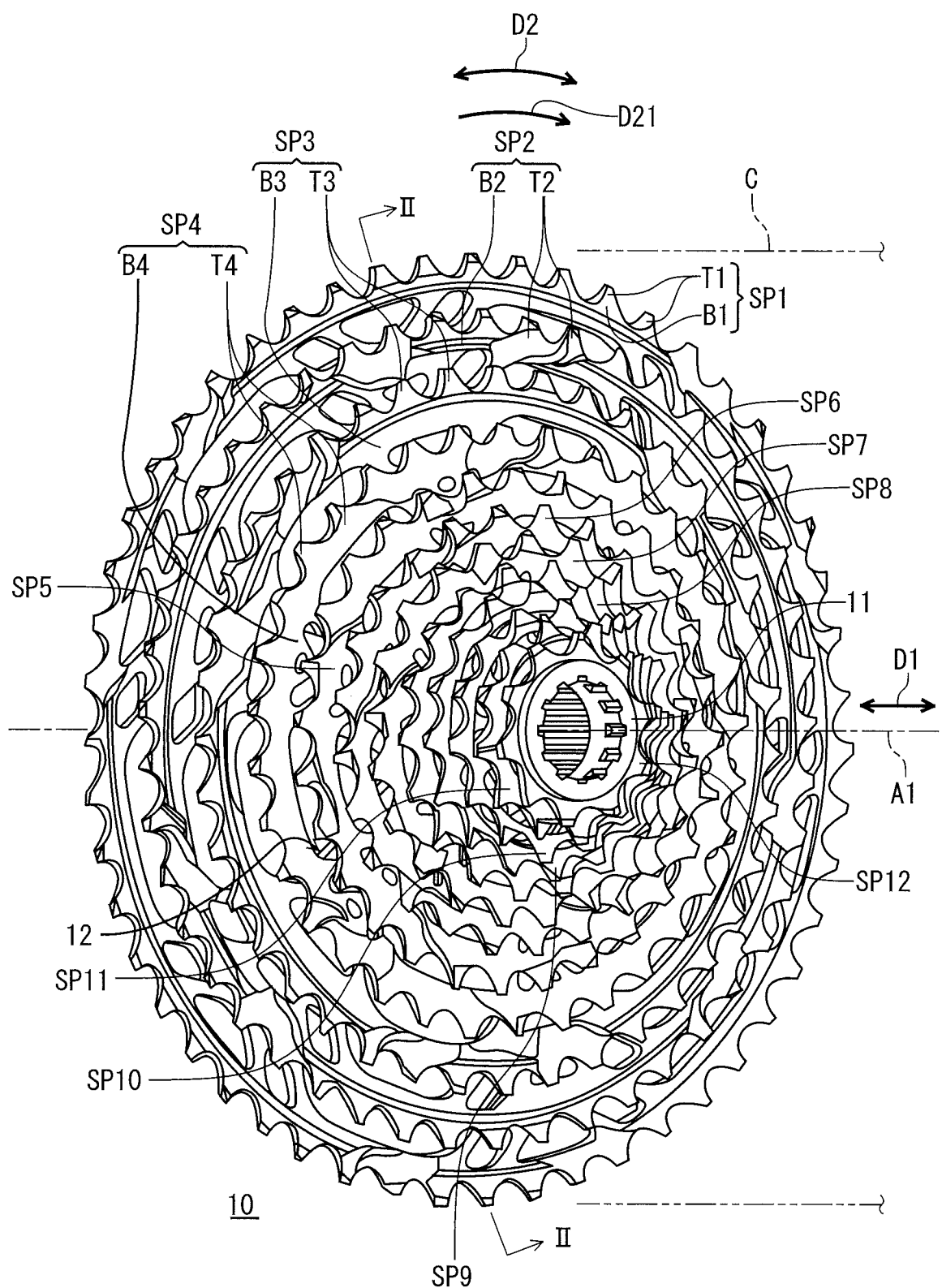
FIG. 1 is a perspective view of a bicycle rear sprocket assembly in accordance with a first embodiment.

The embodiments will now be described with reference to the accompanying drawings, wherein like reference numerals designate corresponding or identical elements throughout the various drawings.

First Embodiment

Referring initially to FIG. 1, in accordance with a first embodiment, a bicycle rear sprocket assembly 10 comprises a sprocket support 12 and a first sprocket SP1. In this embodiment, the bicycle rear sprocket assembly 10 further comprises a second sprocket SP2, a third sprocket SP3, and a fourth sprocket SP4. The bicycle rear sprocket assembly 10 can further comprise fifth to twelfth sprockets SP5 to SP12. However, at least one of the second to twelfth sprockets SP2 to SP12 can be omitted in the bicycle rear sprocket assembly 10 or more bicycle sprockets can be added to the bicycle rear sprocket assembly 10. The plurality of sprockets SP1 to SP12 has a rotational center axis A1. The plurality of sprockets SP1 to SP12 is arranged in an axial direction D1 parallel to the rotational center axis A1. In the illustrated embodiment, the first sprocket SP1 corresponds to a low gear of the bicycle rear sprocket assembly 10. However, the first sprocket SP1 can correspond to another gear in the bicycle rear sprocket assembly 10. For example, the first sprocket SP1 can correspond to either the second sprocket SP2 or the third sprocket SP3. Each of the plurality of the sprockets SP1 to SP12 is not limited to the illustrated embodiment.

The bicycle rear sprocket assembly 10 is configured to engage with a bicycle chain C. The bicycle rear sprocket assembly 10 is configured to be rotated about the rotational center axis A1 in a driving rotational direction D21 during pedaling. The driving rotational direction D21 is defined along a circumferential direction D2 of the bicycle rear sprocket assembly 10.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle rear sprocket assembly 10, should be interpreted relative to the bicycle equipped with the bicycle rear sprocket assembly 10 as used in an upright riding position on a horizontal surface.

As seen in FIG. 1, the plurality of sprockets SP1 to SP12 each includes a sprocket body and a plurality of sprocket teeth. More specifically, the first sprocket SP1 includes a first sprocket body B1 and a plurality of first sprocket teeth T1. The second sprocket SP2 includes a second sprocket body B2 and a plurality of second sprocket teeth T2. The third sprocket SP3 includes a third sprocket body B3 and a plurality of third sprocket teeth T3. The fourth sprocket SP4 includes a fourth sprocket body B4 and a plurality of fourth sprocket teeth T4.

The plurality of first sprocket teeth T1 extend radially outwardly from the first sprocket body B1 with respect to the rotational center axis A1. The plurality of second sprocket teeth T2 extend radially outwardly from the second sprocket body B2 with respect to the rotational center axis A1. The plurality of third sprocket teeth T3 extend radially outwardly from the third sprocket body B3 with respect to the rotational center axis A1. The plurality of fourth sprocket teeth T4 extend radially outwardly from the fourth sprocket body B4 with respect to the rotational center axis A1.

Figure 2:
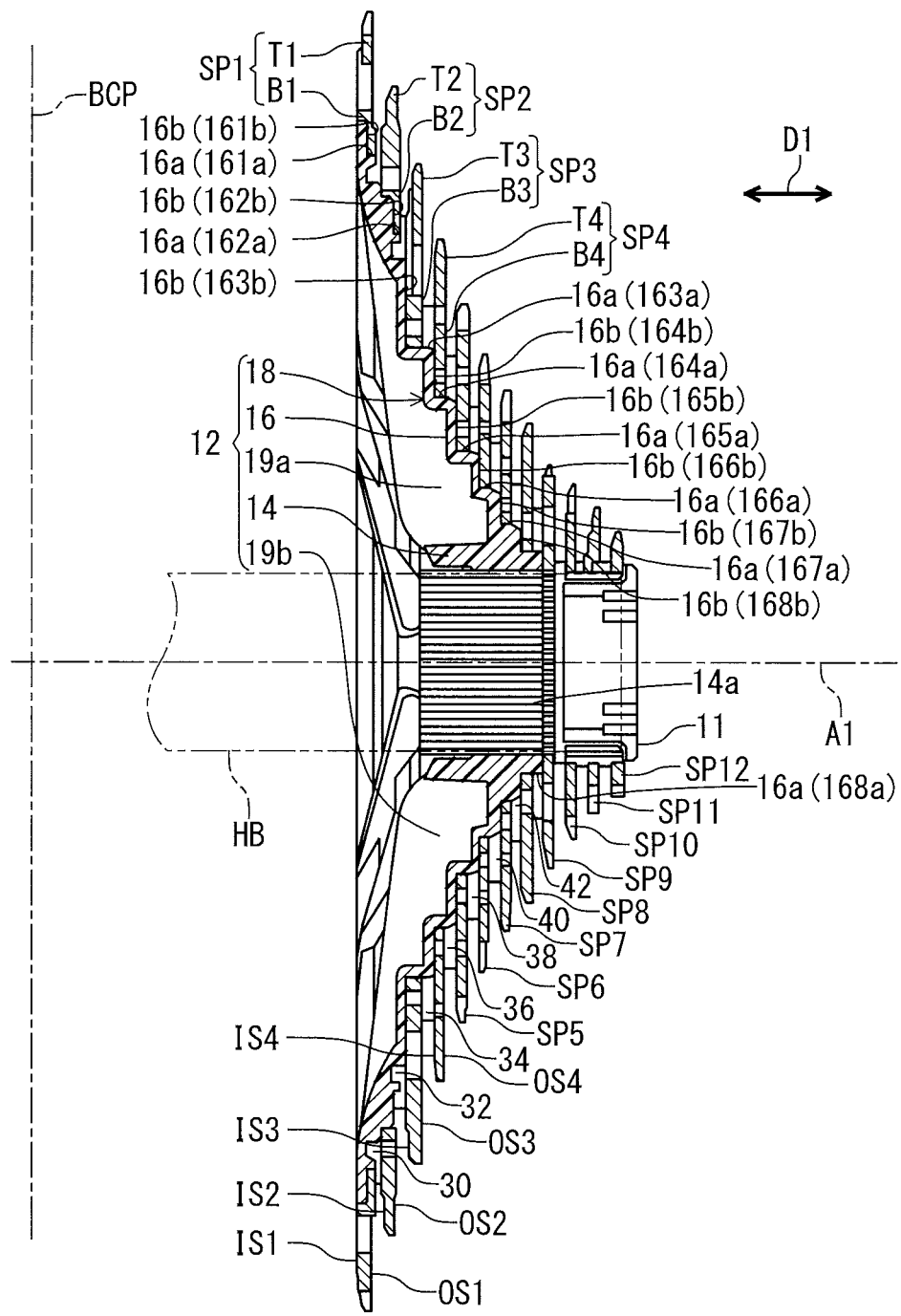
FIG. 2 is a cross-sectional view of the bicycle rear sprocket assembly taken along line II-II of FIG. 1.
Figure 3:
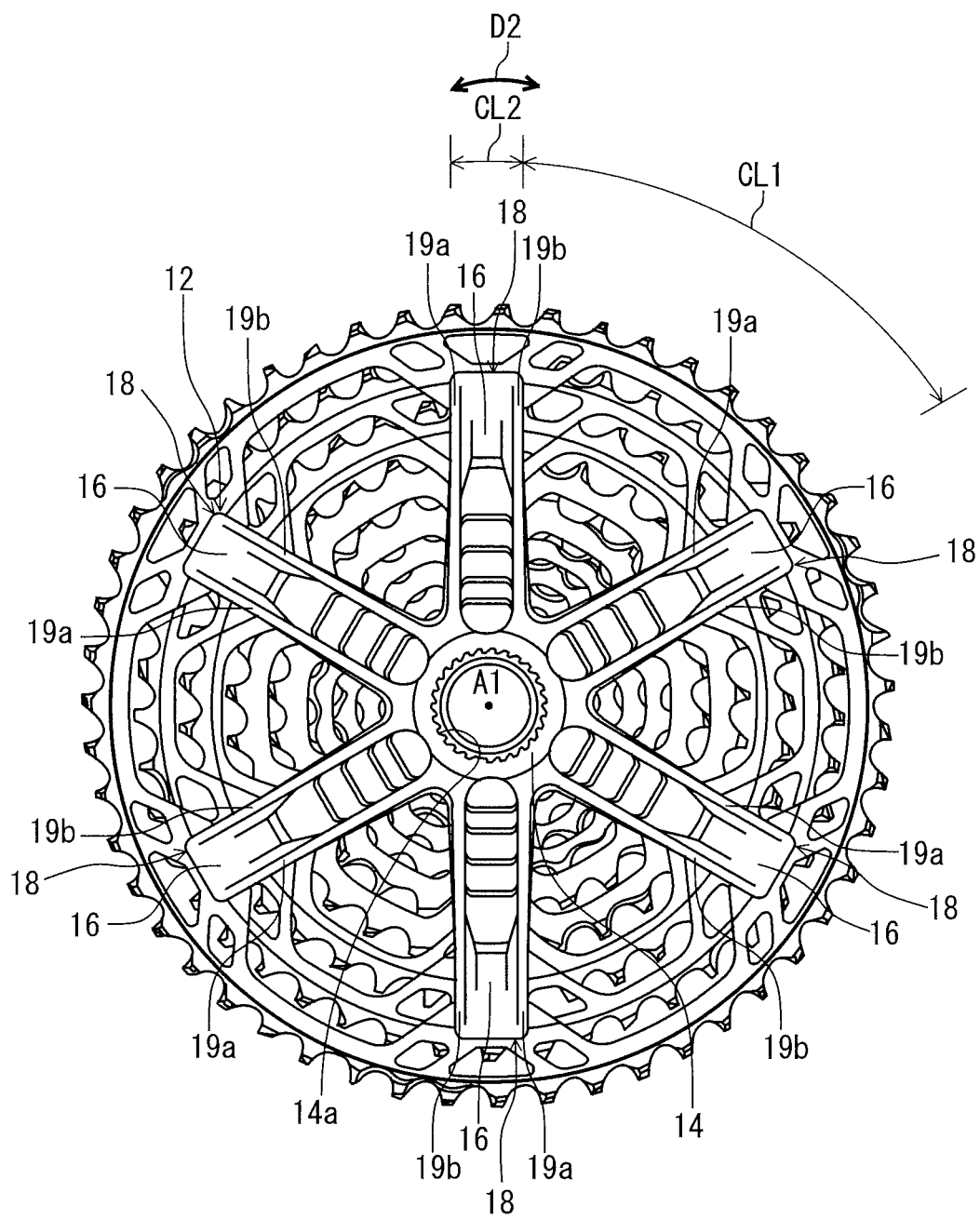
FIG. 3 is an elevational view of the bicycle rear sprocket assembly illustrated in FIG. 1.
Figure 4:
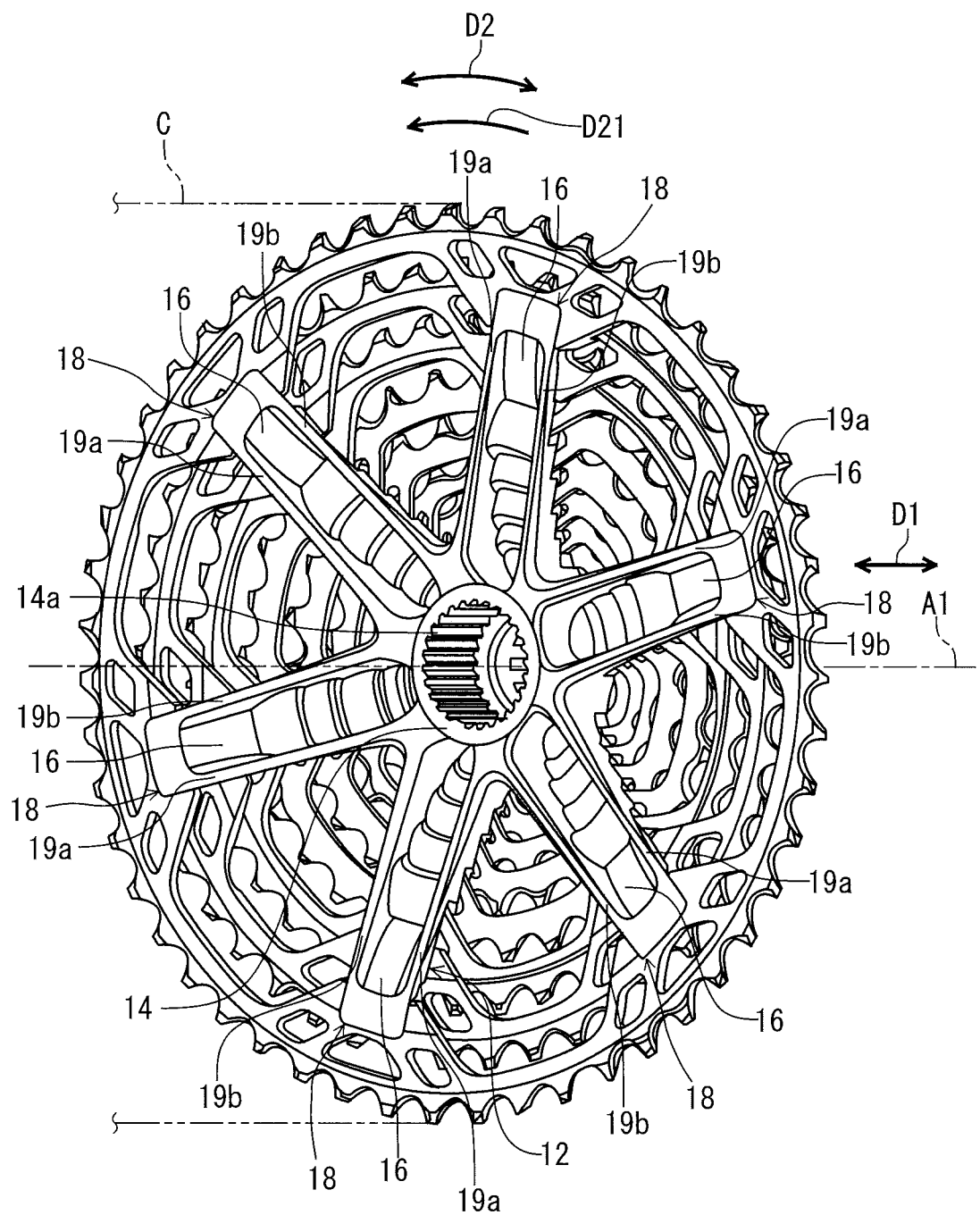
FIG. 4 is a perspective view of the bicycle rear sprocket assembly illustrated in FIG. 1.

As seen in FIG. 2, the sprocket support 12 is a separate member from the plurality of sprockets SP1 to SP12. The sprocket support 12 includes a hub engagement part 14 configured to engage with a bicycle hub assembly HB. As seen in FIGS. 2 to 4, the hub engagement part 14 includes at least one spline 14a configured to engage with the bicycle hub assembly HB. However, the hub engagement part 14 can engage with the bicycle hub assembly HB via a different structure from the at least one spline 14a. The sprocket support 12 includes a plurality of sprocket attachment members 16 extending radially outwardly from the hub engagement part 14 with respect to the rotational center axis A1 of the bicycle rear sprocket assembly 10. The first sprocket SP1 is attached to the plurality of sprocket attachment members 16. In the illustrated embodiment, the second sprocket SP2, the third sprocket SP3, and the fourth sprocket SP4 are attached to the plurality of sprocket attachment members 16. However, at least one of the second sprocket SP2, the third sprocket SP3, and the fourth sprocket SP4 can be directly attached to the bicycle hub assembly HB. The fifth to eighth sprockets SP5 to SP8 can be attached to the plurality of sprocket attachment members 16. The ninth to twelfth sprockets SP9 to SP12 can be directly or indirectly attached to the bicycle hub assembly HB. In the illustrated embodiment, the ninth sprocket S9 is directly attached to the bicycle hub assembly HB. The tenth to twelfth sprockets SP10 to SP12 are attached to the bicycle hub assembly HB via an end cap 11.

The first sprocket SP1 is made of a metallic material. Preferably, the first sprocket SP1 is made of aluminum. Similarly, the second sprocket SP2, the third sprocket SP3, and the fourth sprocket SP4 are made of a metallic material. The second sprocket SP2, the third sprocket SP3, and the fourth sprocket SP4 are made of aluminum. The fifth to twelfth sprockets SP5 to SP12 can be made of a metallic material. The fifth to twelfth sprockets SP5 to SP12 can be made of aluminum. However, materials of the first to twelfth sprockets SP1 to SP12 are not limited to this embodiment. Each of the first to twelfth sprockets SP1 to SP12 can be made of at least one of iron, titanium, and stainless steel. Each of the first to twelfth sprockets SP1 to SP12 can include a non-metallic material.

The sprocket support 12 is made of resin. However, the sprocket support 12 can be made of fiber-reinforced-plastic and carbon-fiber-reinforced-plastic. Further, the sprocket support 12 can be made of a metallic material such as iron, aluminum, titanium, and stainless steel. In a case where the sprocket support 12 is made of a material different from a material that the first to eighth sprockets SP1 to SP8 are made of, it is possible to expand the design flexibility of the bicycle rear sprocket assembly 10. Further, in a case where the sprocket support 12 is made of a non-metallic material such as resin, it is possible to save the weight of the sprocket support 12.

As seen in FIGS. 1 and 2, the sprocket bodies (e.g. B1, B2, B3, and B4) of the plurality of sprockets SP1 to SP8 are attached to the sprocket attachment members 16 of the sprocket support 12 without using a separate metallic fastening member such as a rivet and a bolt. Specifically, the first sprocket SP1 is attached to the plurality of the sprocket attachment members 16 via adhesive. More specifically, the first sprocket body B1 of the first sprocket SP1 is attached to the plurality of the sprocket attachment members via adhesive. The second to fourth sprockets SP2 to SP4 are attached to the plurality of the sprocket attachment members 16 via adhesive. More specifically, the second to fourth sprocket bodies B2 to B4 of the second to fourth sprockets SP2 to SP4 are attached to the plurality of the sprocket attachment members via adhesive. The fifth to eighth sprockets SP5 to SP8 can be attached to the plurality of the sprocket attachment members 16 via adhesive. However, at least one of the sprockets SP1 to SP8 can be attached to the sprocket attachment members 16 in a different way such as diffusion bonding. The at least one of the sprockets SP1 to SP8 can be attached to the sprocket attachment members 16 via at least one metallic fastener.

As seen in FIGS. 3 and 4, a total number of the plurality of sprocket attachment members 16 is equal to or larger than six. More specifically, the total number of the plurality of sprocket attachment members 16 is equal to six. However, a total number of the sprocket attachment members 16 is not limited in this embodiment. As seen in FIGS. 3 and 4, the sprocket support 12 includes the plurality of support arms 18 extending radially outwardly from the hub engagement part 14. However, the sprocket support 12 can have a shape like a dome, and the sprocket support 12 may not include the plurality of support arms 18. The first sprocket SP1 is attached to the plurality of support arms 18. The second sprocket SP2, the third sprocket SP3, and the fourth sprocket SP4 are attached to the plurality of support arms 18. The fifth to eighth sprockets SP5 to SP8 can be attached to the plurality of support arms 18. However, the first to eighth sprockets SP1 to SP8 can be attached to a different part of the sprocket support 12 from the plurality of support arms 18.

As seen in FIGS. 3 and 4, at least one arm of the plurality of support arms 18 includes a first wall 19a, a second wall 19b, and one of the plurality of the sprocket attachment members 16. In this embodiment, each of the plurality of support arms 18 includes the first wall 19a, the second wall 19b, and the one of the plurality of the sprocket attachment members 16. The first wall 19a is spaced apart from the second wall 19b in the circumferential direction D2 with respect to the rotational center axis A1. As seen in FIG. 2, each of the first wall 19a and the second wall 19b extends from the one of the plurality of the sprocket attachment members 16 in the axial direction D1 with respect to the rotational center axis A1. More specifically, each of the first wall 19a and the second wall 19b is connected to one of the plurality of sprocket attachment members 16 and extends radially inwardly from the one of the plurality of sprocket attachment members 16. Each of the first wall 19a and the second wall 19b extends from the one of the plurality of sprocket attachment members 16 toward a bicycle center plane BCP in the axial direction D1. Accordingly, the support arms 18 can improve the strength of the sprocket attachment members 16.

As seen in FIG. 3, the plurality of support arms 18 are spaced apart from each other at circumferential intervals CL1 in the circumferential direction D2 with respect to the rotational center axis A1. In the illustrated embodiment, the plurality of support arms 18 respectively have maximum circumferential lengths CL2 defined in the circumferential direction D2. Each of the maximum circumferential lengths CL2 is shorter than or equal to the circumferential intervals CL1.

Figure 5:
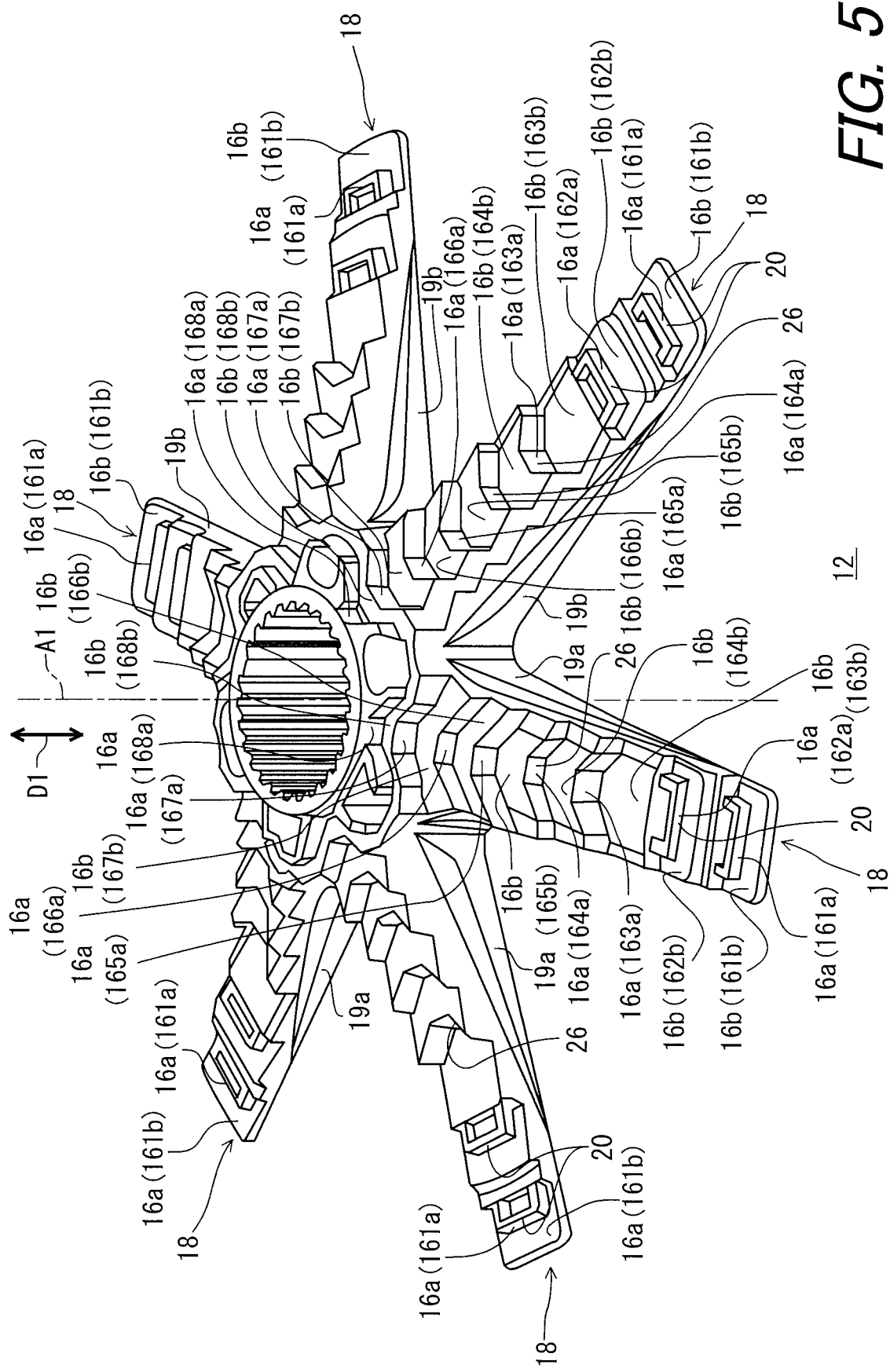
FIG. 5 is a perspective view of a sprocket support in the bicycle rear sprocket assembly.

As seen in FIGS. 2 and 5, at least one of the plurality of sprocket attachment members 16 includes a first radial support surface 16a and a first axial support surface 16b. In the illustrated embodiment, each of the plurality of sprocket attachment members 16 includes the first radial support surface 16a and the first axial support surface 16b. The first radial support surface 16a faces radially outwardly. More specifically, the first radial support surface 16a faces radially outwardly with respect to the rotational center axis A1. Further, the first axial support surface 16b faces in the axial direction D1. More specifically, the first axial support surface 16b faces axially outwardly with respect to the bicycle center plane BCP. However, the at least one of the plurality of sprocket attachment members 16 can include a support surface facing in a different direction from a radial outward direction and the axial direction D1 in place of the first radial support surface 16a and the first axial support surface 16b. The first radial support surface 16a and the first axial support surface 16b can make it easier to radially and axially position the plurality of sprockets SP1 to SP8 relative to the sprocket attachment members 16.

As seen in FIG. 2, the first sprocket SP1 is attached to the first radial support surface 16a and the first axial support surface 16b. The second sprocket SP2, the third sprocket SP3, and the fourth sprocket SP4 are attached to the first radial support surface 16a and the first axial support surface 16b. The fifth to eighth sprockets SP5 to SP8 can be attached to the first radial support surface 16a and the first axial support surface 16b. However, the first to eighth sprockets SP1 to SP8 can be attached to a support surface of the at least one of the plurality of sprocket attachment members 16 which faces in the different direction from the radial outward direction and the axial direction D1. In the following explanation, the first radial support surface 16a and the first axial support surface 16b to which the first sprocket SP1 is attached can be referred to as a first radial support surface 161a and a first axial support surface 161b. Similarly, the first radial support surface 16a and the first axial support surface 16b to which the second sprocket SP2, the third sprocket SP3, the fourth sprocket SP4, the fifth sprocket SP5, the sixth sprocket SP6, the seventh sprocket SP7, and the eighth sprocket SP8 are attached can be referred to as a first radial support surface 162a, 163a, 164a, 165a, 166a, 167a, and 168a and a first axial support surface 162b, 163b, 164b, 165b, 166b, 167b, and 168b, respectively.

Figure 6:
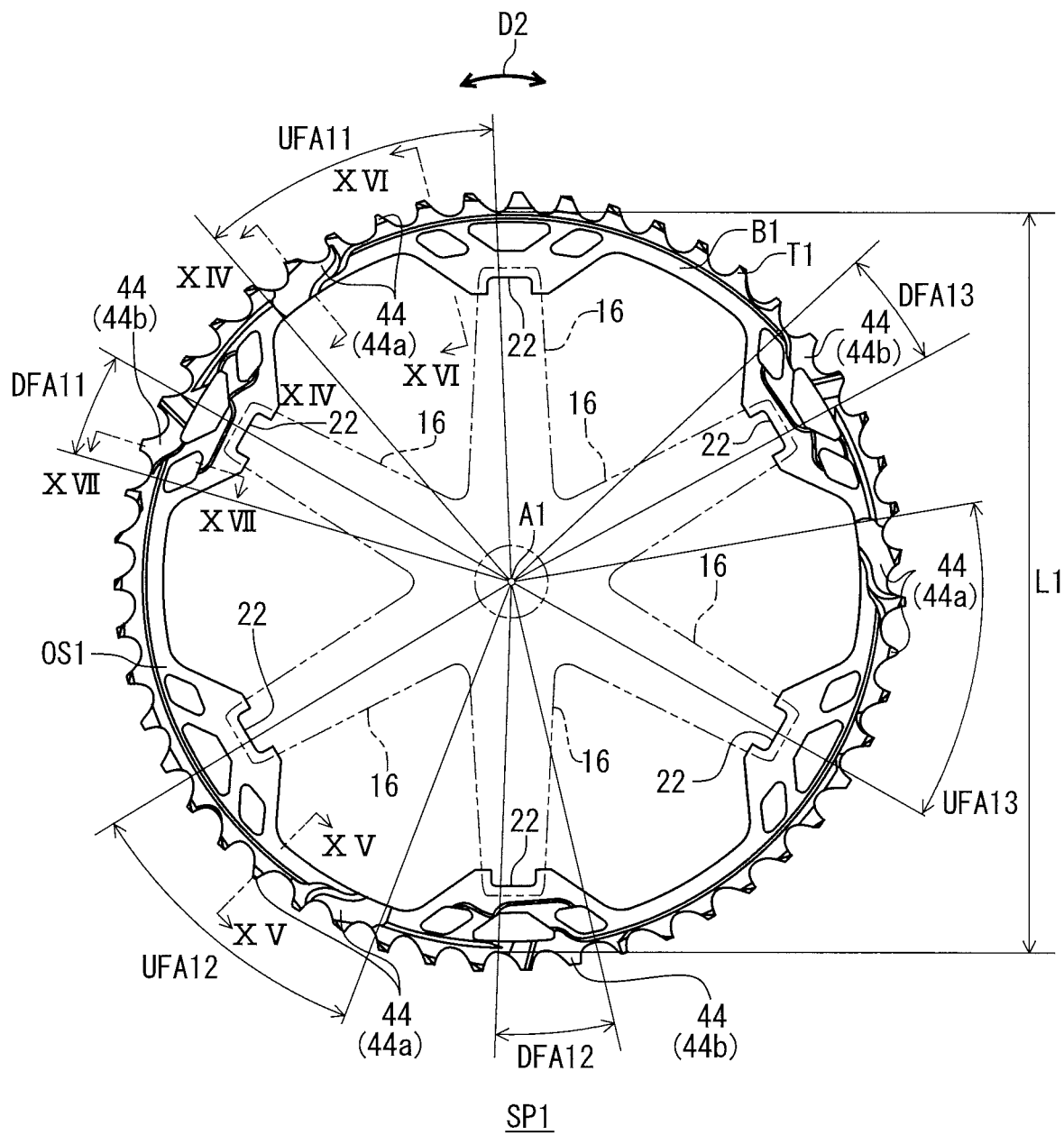
FIG. 6 is an elevational view of a first sprocket of the bicycle rear sprocket assembly illustrated in FIG. 1.
Figure 7:
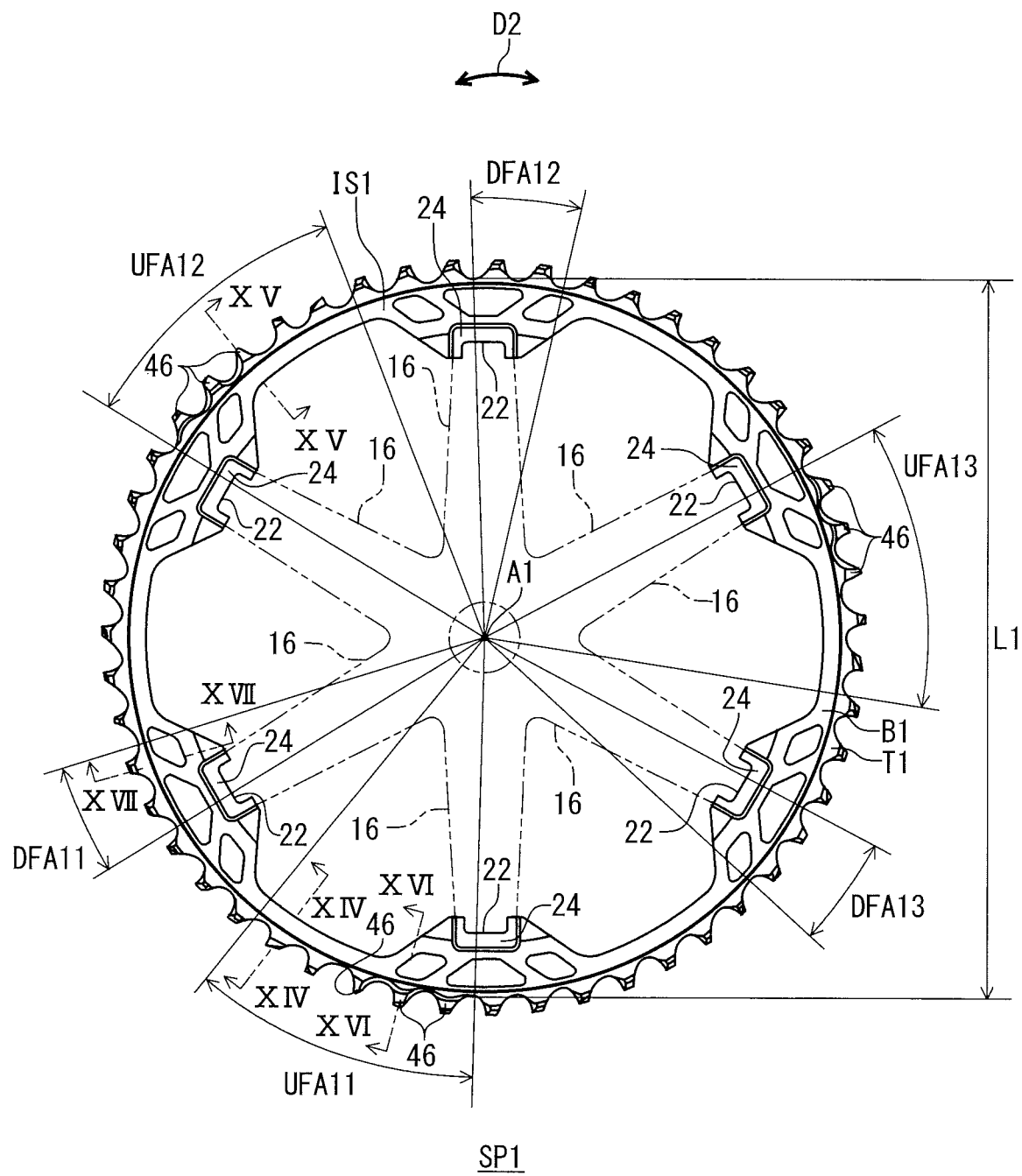
FIG. 7 is an elevational view of the first sprocket of the bicycle rear sprocket assembly illustrated in FIG. 1.
Figure 8:
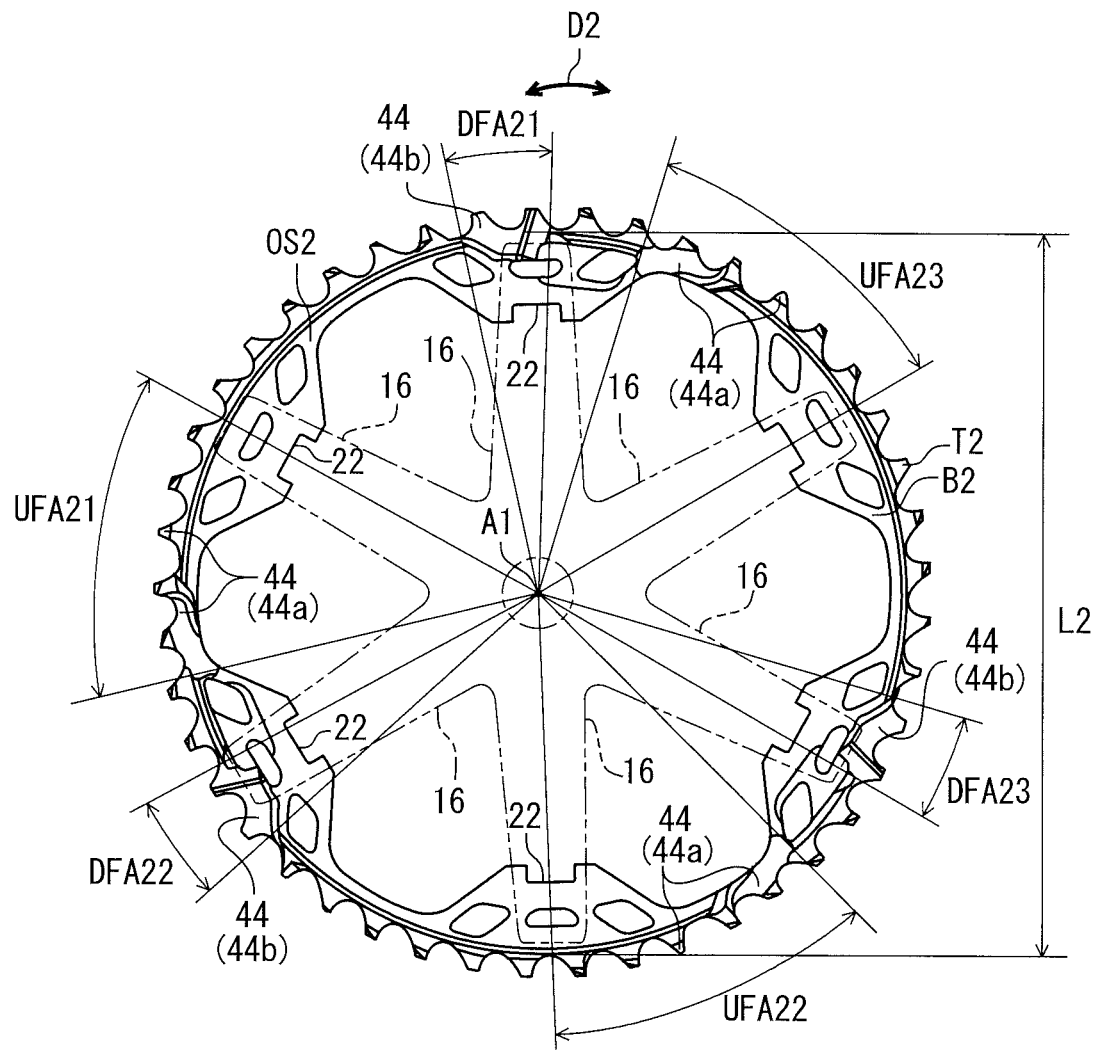
FIG. 8 is an elevational view of a second sprocket of the bicycle rear sprocket assembly illustrated in FIG. 1.
Figure 9:
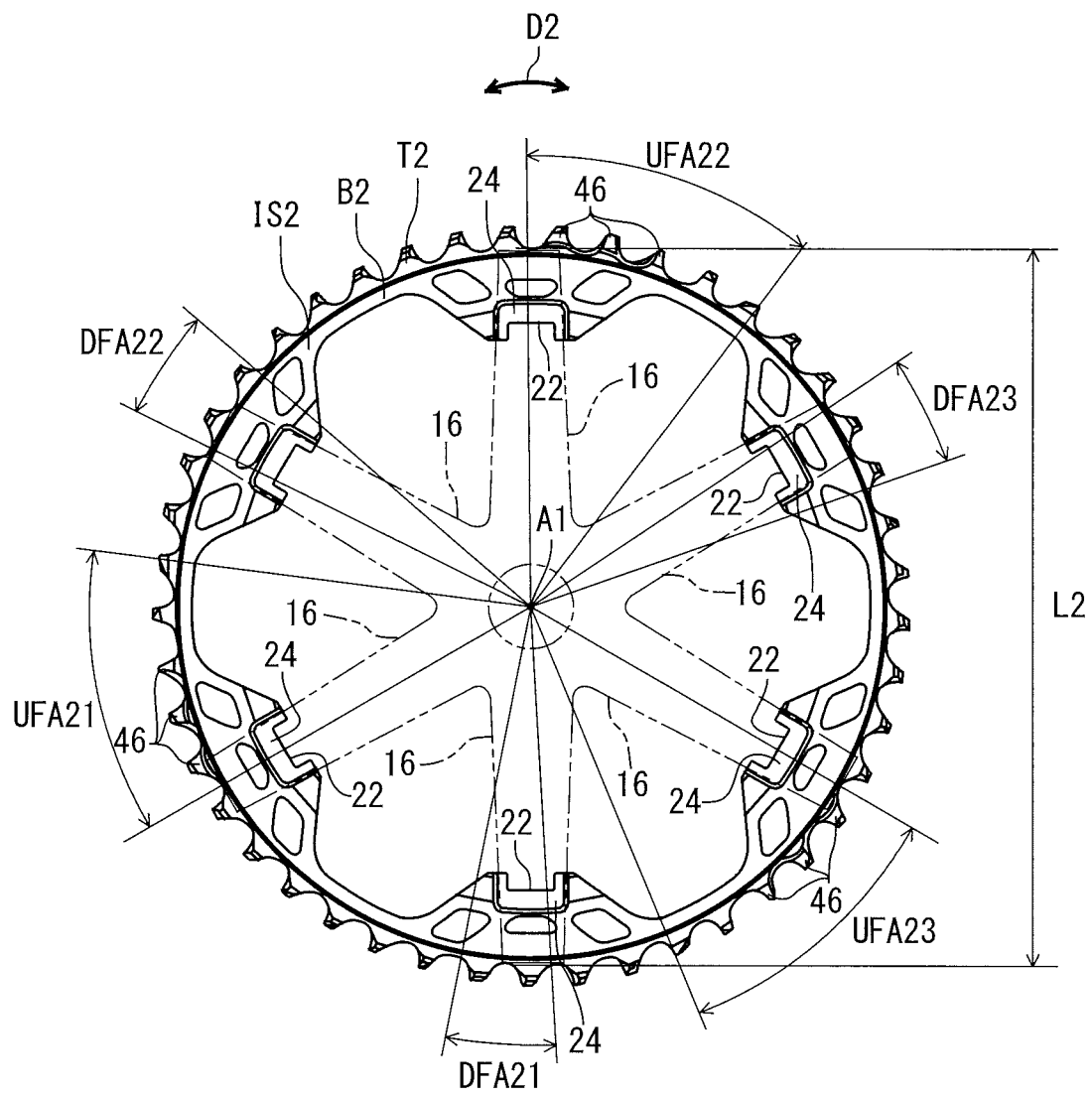
FIG. 9 is an elevational view of the second sprocket of the bicycle rear sprocket assembly illustrated in FIG. 1.

As seen in FIG. 5, each of the first radial support surfaces 161a and 162a has first restricting parts 20. Each of the first restricting parts 20 includes a projection protruding radially outwardly with respect to the rotational center axis A1. As seen in FIG. 6, the first sprocket SP1 has second restricting parts 22. Each of the second restricting parts 22 includes a notch hollowed radially outwardly with respect to the rotational center axis A1 to engage with each of the first restricting parts 20. Further, as seen in FIG. 7, the first sprocket SP1 has axial recesses 24. Each of the axial recesses 24 is recessed from an axial inward surface IS1 of the first sprocket SP1 in the axial direction D1. The first axial support surface 161b is fitted in the axial recesses 24. Similarly, as seen in FIGS. 8 and 9, the second sprocket SP2 has the second restricting parts 22 and the axial recesses 24. The first restricting parts 20 of the first radial support surfaces 161a and 162a are configured to respectively engage with the second restricting parts 22 of the sprockets SP1 and SP2 to restrict the sprockets SP1 and SP2 from rotating relative to the sprocket support 12 about the rotational center axis A1. Accordingly, the driving force that the first sprocket SP1 and the second sprocket SP2 receive from the bicycle chain C can be transmitted to the sprocket support 12.

Figure 10:
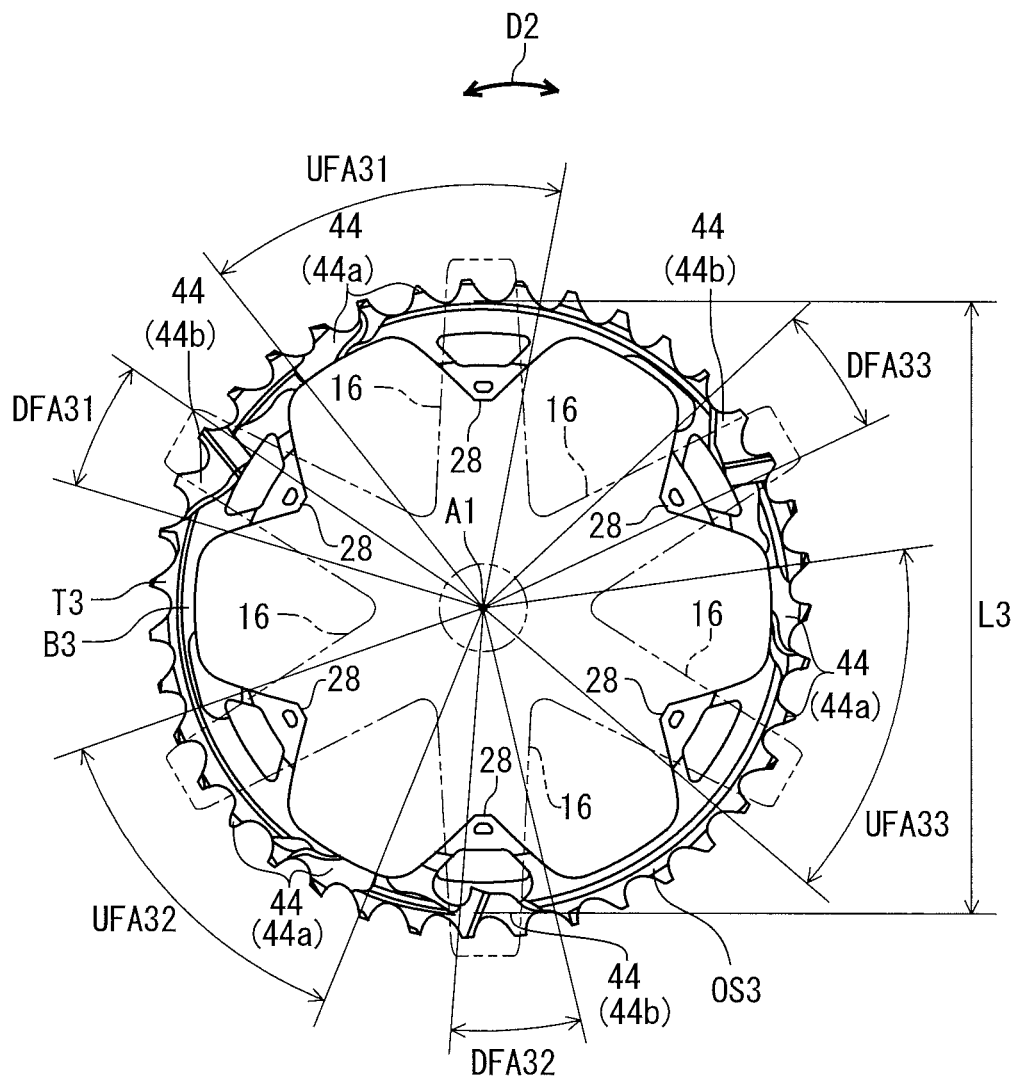
FIG. 10 is an elevational view of a third sprocket of the bicycle rear sprocket assembly illustrated in FIG. 1.
Figure 11:
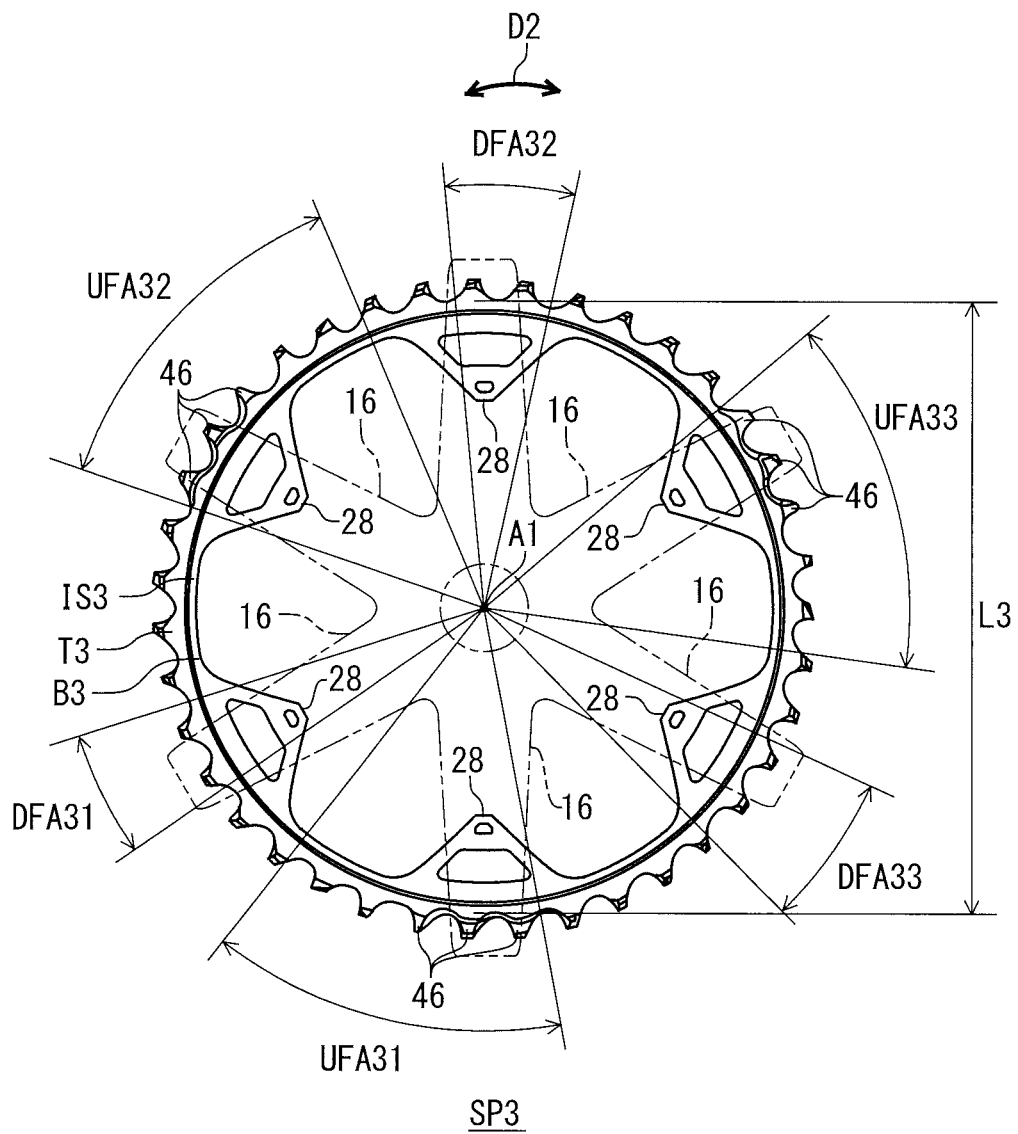
FIG. 11 is an elevational view of the third sprocket of the bicycle rear sprocket assembly illustrated in FIG. 1.
Figure 12:
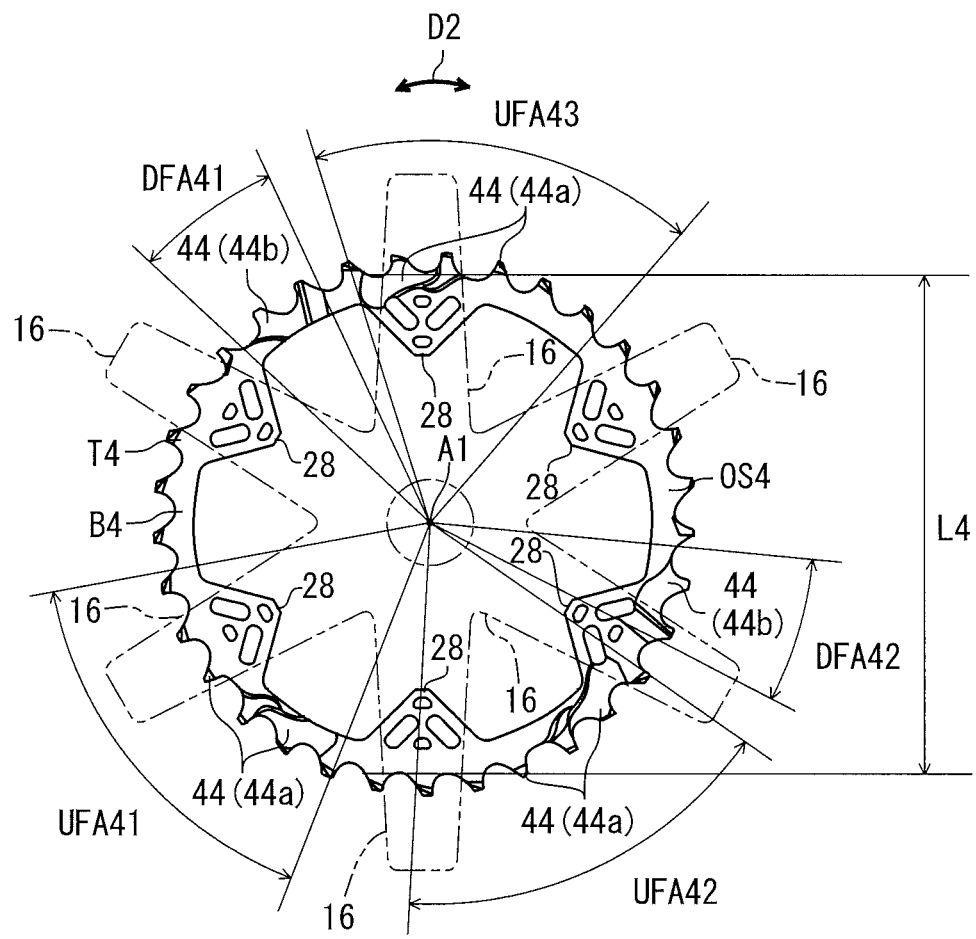
FIG. 12 is an elevational view of a fourth sprocket of the bicycle rear sprocket assembly illustrated in FIG. 1.
Figure 13:
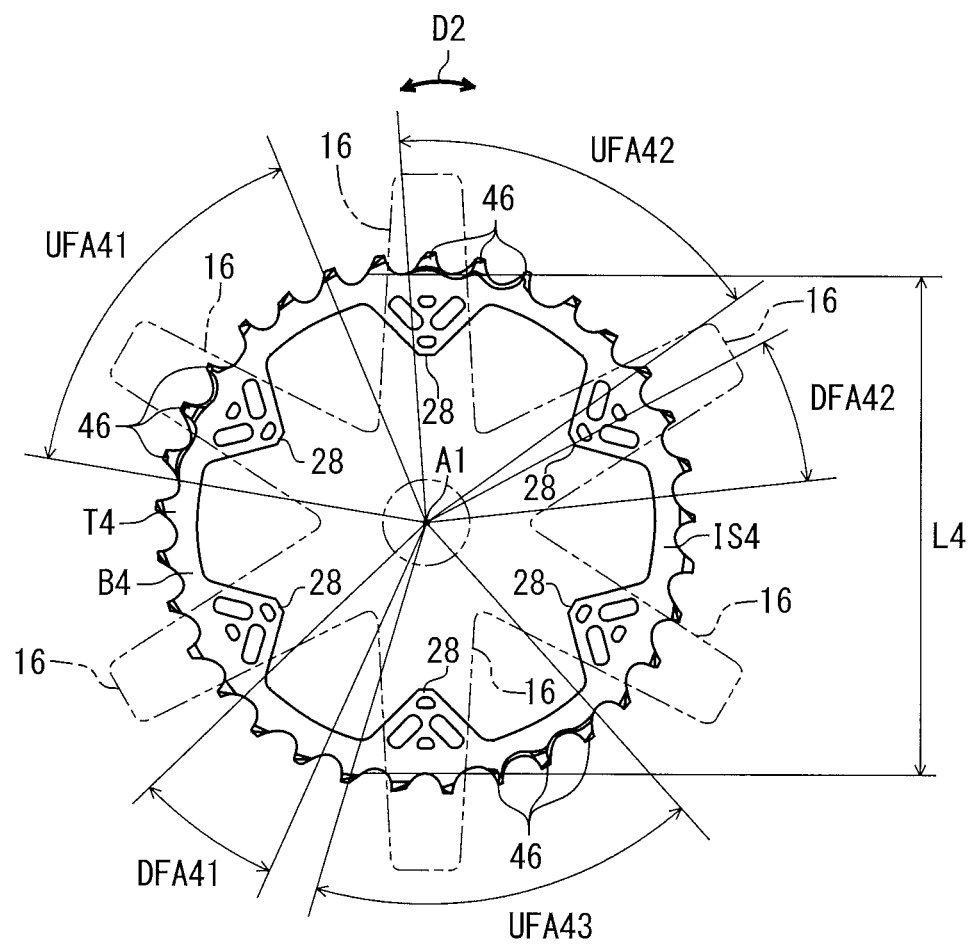
FIG. 13 is an elevational view of the fourth sprocket of the bicycle rear sprocket assembly illustrated in FIG. 1.

Further, as seen in FIG. 5, each of the first radial support surfaces 163a, 164a, 165a, 166a, 167a, and 168a has third restricting parts 26. Each of the third restricting parts 26 includes a notch hollowed radially inwardly with respect to the rotational center axis A1. As seen in FIGS. 10 and 11, the third sprocket SP3 has fourth restricting parts 28. Each of the fourth restricting parts 28 includes a projection protruding radially inwardly with respect to the rotational center axis A1 to engage with each of the third restricting parts 26. Similarly, as seen in FIGS. 12 and 13, the fourth sprocket SP4 has the fourth restricting parts 28. Each of the fifth to eighth sprockets SP5 to SP8 has the fourth restricting parts 28. The fifth to eighth sprockets SP5 to SP8 will not be illustrated in detail here for the sake of brevity, because each of the fifth to eighth sprockets SP5 to SP8 has substantially the same feature as the third or fourth sprocket SP3 or SP4. The third restricting parts 26 of the first radial support surfaces 163a, 164a, 165a, 166a, 167a, and 168a are configured to respectively engage with the fourth restricting parts 28 of the sprockets SP3 to SP8 to restrict the sprockets SP3 to SP8 from rotating relative to the sprocket support 12 about the rotational center axis A1. Accordingly, the driving force that the third to eighth sprockets SP3 to SP8 receive from the bicycle chain C can be transmitted to the sprocket support 12.

In the illustrated embodiment, the sprocket bodies B1 to B4 of the plurality of sprockets SP1 to SP4 can be respectively attached to the first radial support surface 16a and the first axial support surface 16b via adhesive. Similarly, the sprocket bodies of the plurality of sprockets SP5 to SP8 can be respectively attached to the first radial support surface 16a and the first axial support surface 16b via adhesive. However, the sprocket bodies (e.g. B1 to B4) of the plurality of sprockets SP1 to SP8 can be attached to the first radial support surface 16a via at least one metallic fastening member.

As seen in FIG. 2, the bicycle rear sprocket assembly 10 includes a plurality of spacers 30, 32, 34, 36, 38, 40, and 42. The plurality of spacers 30, 32, 34, 36, 38, 40, and 42 are respectively provided between adjacent two of the plurality of sprockets SP1 to SP8 in the axial direction D1. In the illustrated embodiment, the plurality of spacers 30, 32, 34, 36, 38, 40, and 42 are respectively provided on the first radial support surface 16a. The plurality of spacers 30, 32, 34, 36, 38, 40, and 42 allow the plurality of sprockets SP1 to SP8 to be easily positioned in the axial direction D1.

As seen in FIG. 2, in the illustrated embodiment, the plurality of spacers 30, 32, 34, 36, 38, 40, and 42 are respectively attached to the adjacent two of the sprocket bodies of the plurality of sprockets SP1 to SP8. For example, the spacers 30 are attached to the sprocket bodies B1 and B2. The spacers 32 are attached to the sprocket bodies B2 and B3. The spacers 34 are attached to the sprocket bodies B3 and B4. The plurality of spacers 30, 32, 34, 36, 38, 40, and 42 are respectively attached to the adjacent two of the sprocket bodies of the plurality of sprockets SP1 to SP8 via adhesive. Specifically, the spacers 30 are attached to the sprocket bodies B1 and B2 via adhesive. The spacers 32 are attached to the sprocket bodies B2 and B3 via adhesive. The spacers 34 are attached to the sprocket bodies B3 and B4 via adhesive. However, the plurality of spacers 30, 32, 34, 36, 38, 40, and 42 can be respectively attached to the adjacent two of the sprocket bodies of the plurality of sprockets SP1 to SP8 via diffusion bonding or at least one metallic fastening member.

As seen in FIGS. 6 and 7, the first sprocket SP1 has a first pitch diameter L1. As seen in FIGS. 1 and 2, the first pitch diameter L1 is the largest pitch-circle diameter in the bicycle rear sprocket assembly 10. However, the first pitch diameter L1 can correspond to another diameter, i.e. the first pitch diameter L1 can be a smaller diameter than the largest pitch-circle diameter in the bicycle rear sprocket assembly 10. A total number of the plurality of first sprocket teeth T1 is equal to or larger than thirty-four. In the illustrated embodiment, the total number of the plurality of first sprocket teeth T1 is equal to fifty-one. However, the total number of the plurality of first sprocket teeth T1 is not limited to the illustrated embodiment.

As seen in FIG. 2, the first sprocket SP1 has an axial outward surface OS1 and an axial inward surface IS1 which is a reverse surface of the axial outward surface OS1 along the rotational center axis A1 of the bicycle rear sprocket assembly 10. FIG. 6 shows the axial outward surface OS1 of the first sprocket SP1. FIG. 7 shows the axial inward surface IS1 of the first sprocket SP1.

As seen in FIGS. 6 and 7, the first sprocket SP1 has a plurality of shifting facilitation areas UFA11, UFA12, UFA13, DFA11, DFA12, and DFA13. That is, the first sprocket SP1 has more than two shifting facilitation areas UFA11, UFA12, UFA13, DFA11, DFA12, and DFA13. A total number of the plurality of shifting facilitation areas UFA11, UFA12, UFA13, DFA11, DFA12, and DFA13 is a divisor of the total number of the plurality of sprocket attachment members 16. Since the total number of the plurality of sprocket attachment members 16 is equal to six, the total number of the plurality of shifting facilitation areas UFA11, UFA12, UFA13, DFA11, DFA12, and DFA13 can be equal to two, three, or six. More preferably, the first sprocket SP1 has three or six shifting facilitation areas. In the illustrated embodiment, the first sprocket SP1 has six shifting facilitation areas UFA11, UFA12, UFA13, DFA11, DFA12, and DFA13. However, the number of shifting facilitation areas is not limited to the illustrated embodiment.

The plurality of the shifting facilitation areas UFA11, UFA12, UFA13, DFA11, DFA12, and DFA13 include at least one of at least one upshifting facilitation area UFA11, UFA12, and UFA13 and at least one downshifting facilitation area DFA11, DFA12, and DFA13. Specifically, the plurality of the shifting facilitation areas UFA11, UFA12, UFA13, DFA11, DFA12, and DFA13 include at least one upshifting facilitation area UFA11, UFA12, and UFA13 and at least one downshifting facilitation area DFA11, DFA12, and DFA13. The first sprocket SP1 can have the plurality of shifting facilitation areas (the sum of the at least one upshifting facilitation area UFA11, UFA12, and UFA13 and the at least one downshifting facilitation area DFA11, DFA12, and DFA13) which is not a divisor of the total number of the plurality of sprocket attachment members 16. In such case, it is preferable that the first sprocket SP1 can have a plurality of upshifting facilitation areas UFA11, UFA12, and UFA13 which is a divisor of the total number of the plurality of sprocket attachment members 16, and/or it is preferable that the first sprocket SP1 can have a plurality of downshifting facilitation areas DFA11, DFA12, and DFA13 which is a divisor of the total number of the plurality of sprocket attachment members 16.

Figure 14:
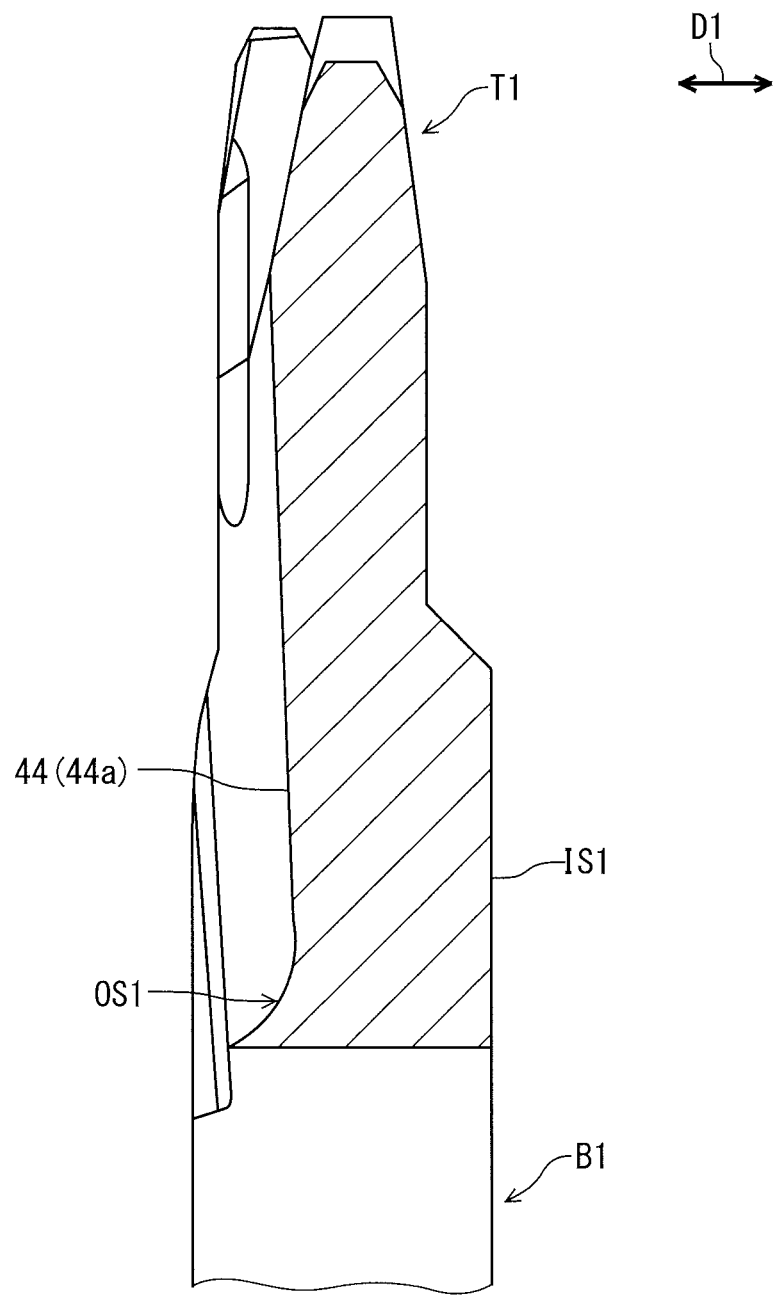
FIG. 14 is a partial cross-sectional view of the first sprocket illustrated in FIGS. 6 and 7 as seen along section line XIV-XIV of FIGS. 6 and 7.
Figure 15:
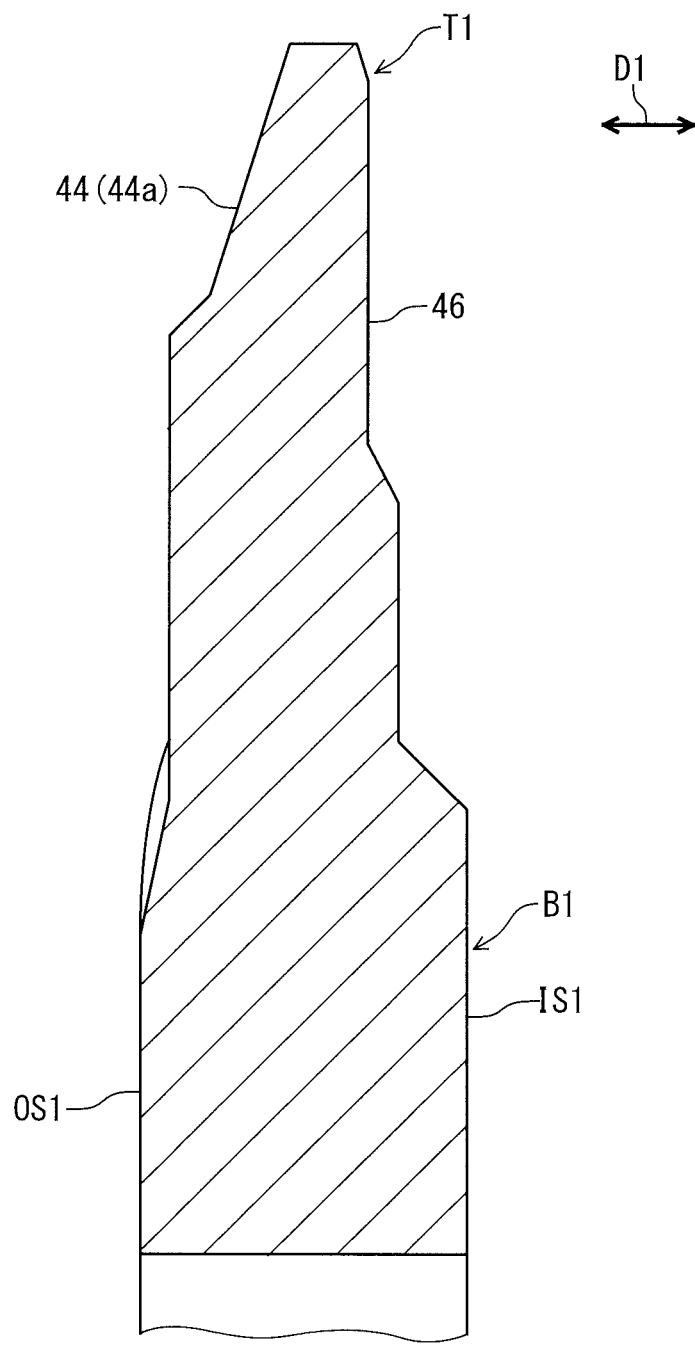
FIG. 15 is a partial cross-sectional view of the first sprocket illustrated in FIGS. 6 and 7 as seen along section line XV-XV of FIGS. 6 and 7.
Figure 16:
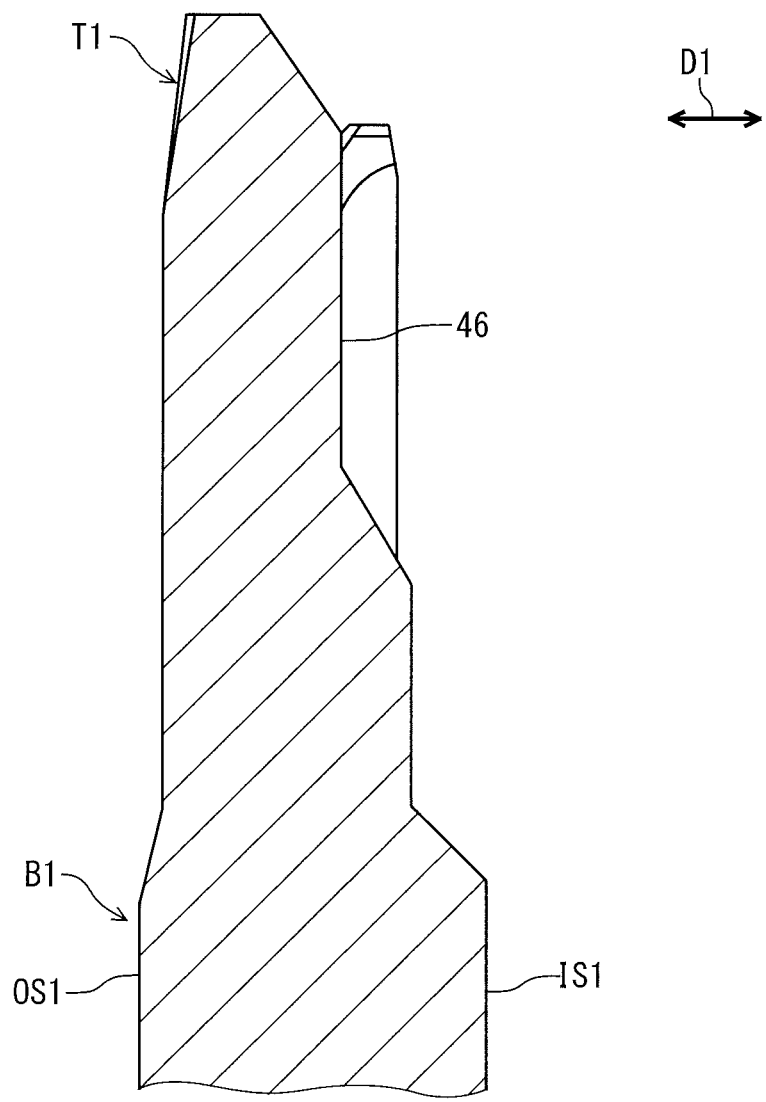
FIG. 16 is a partial cross-sectional view of the first sprocket illustrated in FIGS. 6 and 7 as seen along section line XVI-XVI of FIGS. 6 and 7.
Figure 17:
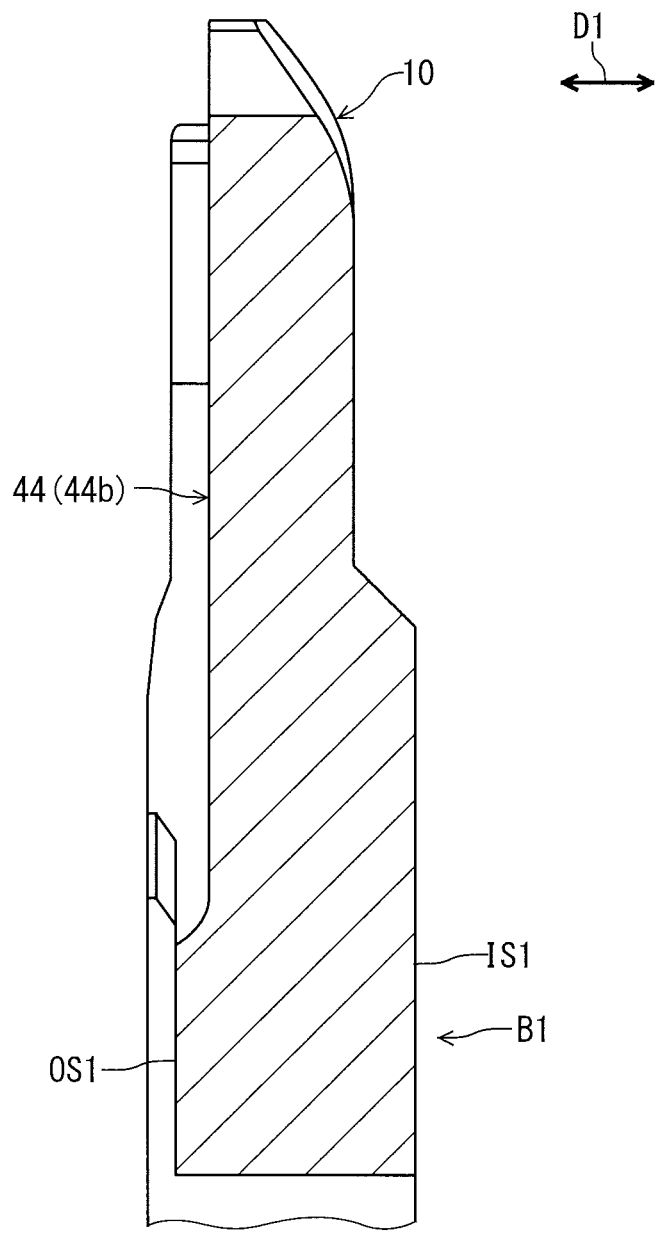
FIG. 17 is a partial cross-sectional view of the first sprocket illustrated in FIGS. 6 and 7 as seen along section line XVII-XVII of FIGS. 6 and 7.

As seen in FIGS. 6, 14, 15, and 17, first axial recesses 44 are provided on the axial outward surface OS1 in the shifting facilitation areas UFA11, UFA12, UFA13, DFA11, DFA12, and DFA13. More specifically, as seen in FIGS. 6, 14, and 15, at least one first outer axial recess 44a is provided on the axial outward surface OS1 in the upshifting facilitation areas UFA11, UFA12, and UFA13. As seen in FIGS. 6 and 17, at least one second outer axial recess 44b is provided on the axial outward surface OS1 in the downshifting facilitation areas DFA11, DFA12, and DFA13. As seen in FIGS. 7, 15, and 16, at least one second axial recess 46 is provided on the axial inward surface IS1 in the at least one upshifting facilitation area UFA11, UFA12, and UFA13.

The at least one first outer axial recess 44a and the at least one second axial recess 46 avoid excessive interference with the bicycle chain C during upshifting operation to facilitate upshifting from the first sprocket SP1 to the second sprocket SP2. The at least one second outer axial recess 44b guides the bicycle chain C toward the first sprocket SP1 from the second sprocket SP2 to facilitate engagement of the bicycle chain C with one of the plurality of first sprocket teeth T1. Accordingly, each of the at least one upshifting facilitation area UFA11, UFA12, and UFA13 is defined by the at least one first outer axial recess 44a and the at least one second axial recess 46. Each of the at least one downshifting facilitation area DFA11, DFA12, and DFA13 is defined by the at least one second outer axial recess 44b. However, other structure than the at least one first outer axial recess 44a and the at least one second axial recess 46 (e.g. protrusion) can be provided in the at least one upshifting facilitation area UFA11, UFA12, and UFA13. Other structure than the at least one second outer axial recess 44b (e.g. protrusion) can be provided in the at least one downshifting facilitation area DFA11, DFA12, and DFA13. In such case, at least one of the first axial recesses 44 can be omitted in the shifting facilitation areas UFA11, UFA12, UFA13, DFA11, DFA12, and DFA13. At least one second axial recess 46 can be omitted in the at least one upshifting facilitation area UFA11, UFA12, and UFA13.

As seen in FIGS. 6 and 7, at least one of the plurality of shifting facilitation areas UFA11, UFA12, UFA13, DFA11, DFA12, and DFA13 is overlapped with one of the plurality of the sprocket attachment members 16. In other words, the at least one of the plurality of shifting facilitation areas UFA11, UFA12, UFA13, DFA11, DFA12, and DFA13 is overlapped with one of the plurality of the sprocket attachment members 16 as seen from the rotational center axis A1 of the first sprocket SP1. In another aspect, one of the plurality of sprocket attachment members 16 is provided between the at least one of the plurality of shifting facilitation areas UFA11, UFA12, UFA13, DFA11, DFA12, and DFA13 and the rotational center axis A1 of the first sprocket SP1. More specifically, each of the plurality of downshifting facilitation areas DFA11, DFA12, and DFA13 is overlapped with one of the plurality of the sprocket attachment members 16. In other words, each of the plurality of downshifting facilitation areas DFA11, DFA12, and DFA13 is overlapped with one of the plurality of the sprocket attachment members 16 as seen from the rotational center axis A1 of the first sprocket SP1. In another aspect, one of the plurality of the sprocket attachment members 16 is provided between each of the plurality of downshifting facilitation areas DFA11, DFA12, and DFA13 and the rotational center axis A1 of the first sprocket SP1.

As seen in FIGS. 8 and 9, the second sprocket SP2 has a second pitch diameter L2. As seen in FIGS. 1 and 2, the second pitch diameter L2 is the second largest pitch-circle diameter in the bicycle rear sprocket assembly 10. A total number of the plurality of second sprocket teeth T2 is equal to or larger than thirty-four. In the illustrated embodiment, the total number of the plurality of second sprocket teeth T2 is equal to forty-five. However, the total number of the plurality of second sprocket teeth T2 is not limited to the illustrated embodiment.

As seen in FIG. 2, the second sprocket SP2 has an axial outward surface OS2 and an axial inward surface IS2 which is a reverse surface of the axial outward surface OS2 along the rotational center axis A1 of the bicycle rear sprocket assembly 10. FIG. 8 shows the axial outward surface OS2 of the second sprocket SP2. FIG. 9 shows the axial inward surface IS2 of the second sprocket SP2.

As seen in FIGS. 8 and 9, the second sprocket SP2 has a plurality of shifting facilitation areas UFA21, DFA22, DFA23, DFA21, DFA22, and DFA23. In the illustrated embodiment, a total number of the plurality of shifting facilitation areas UFA21, DFA22, DFA23, DFA21, DFA22, and DFA23 is equal to six. However, some of the plurality of shifting facilitation areas UFA21, DFA22, DFA23, DFA21, DFA22, and DFA23 can be omitted. In such case, the total number of the plurality of shifting facilitation areas is a divisor of the total number of the plurality of sprocket attachment members 16. The plurality of the shifting facilitation areas UFA21, DFA22, DFA23, DFA21, DFA22, and DFA23 include at least one of at least one upshifting facilitation area UFA21, DFA22, and DFA23 and at least one downshifting facilitation area DFA21, DFA22, and DFA23. Specifically, the plurality of the shifting facilitation areas UFA21, DFA22, DFA23, DFA21, DFA22, and DFA23 include at least one upshifting facilitation area UFA21, DFA22, and DFA23 and at least one downshifting facilitation area DFA21, DFA22, and DFA23. The upshifting facilitation areas UFA21, DFA22, and DFA23 have substantially the same structure as the upshifting facilitation areas UFA11, UFA12, and UFA13 of the first sprocket SP1, but their positions with respect to the plurality of the sprocket attachment members 16 are different from those of the upshifting facilitation areas UFA11, UFA12, and UFA13 of the first sprocket SP1. The downshifting facilitation areas DFA21, DFA22, and DFA23 have substantially the same structure as the downshifting facilitation areas DFA11, DFA12, and DFA13 of the first sprocket SP1, but their positions with respect to the plurality of the sprocket attachment members 16 are different from those of the downshifting facilitation areas DFA11, DFA12, and DFA13 of the first sprocket SP1. Thus, elements in shifting facilitation areas UFA21, DFA22, DFA23, DFA21, DFA22, and DFA23 having substantially the same function as those in shifting facilitation areas UFA11, UFA12, UFA13, DFA11, DFA12, and DFA13, respectively will be numbered the same here, and will not be described and/or illustrated again in detail here for the sake of brevity.

As seen in FIGS. 8 and 9, at least one of the plurality of shifting facilitation areas UFA21, DFA22, DFA23, DFA21, DFA22, and DFA23 is overlapped with one of the plurality of the sprocket attachment members 16. In other words, the at least one of the plurality of shifting facilitation areas UFA21, DFA22, DFA23, DFA21, DFA22, and DFA23 is overlapped with one of the plurality of the sprocket attachment members 16 as seen from the rotational center axis A1 of the second sprocket SP2. In another aspect, one of the plurality of the sprocket attachment members 16 is provided between the at least one of the plurality of shifting facilitation areas UFA21, DFA22, DFA23, DFA21, DFA22, and DFA23 and the rotational center axis A1 of the second sprocket SP2. More specifically, each of the plurality of downshifting facilitation areas DFA21, DFA22, and DFA23 is overlapped with one of the plurality of the sprocket attachment members 16. In other words, each of the plurality of downshifting facilitation areas DFA21, DFA22, and DFA23 is overlapped with one of the plurality of the sprocket attachment members 16 as seen from the rotational center axis A1 of the second sprocket SP2. In another aspect, one of the plurality of the sprocket attachment members 16 is provided between each of the plurality of downshifting facilitation areas DFA21, DFA22, and DFA23 and the rotational center axis A1 of the second sprocket SP2.

As seen in FIGS. 10 and 11, the third sprocket SP3 has a third pitch diameter L3. As seen in FIGS. 1 and 2, the third pitch diameter L3 is the third largest pitch-circle diameter in the bicycle rear sprocket assembly 10. A total number of the plurality of third sprocket teeth T3 is equal to or larger than thirty-four. In the illustrated embodiment, the total number of the plurality of third sprocket teeth T3 is equal to thirty-nine. However, the total number of the plurality of third sprocket teeth T3 is not limited to the illustrated embodiment.

As seen in FIG. 2, the third sprocket SP3 has an axial outward surface OS3 and an axial inward surface IS3 which is a reverse surface of the axial outward surface OS3 along the rotational center axis A1 of the bicycle rear sprocket assembly 10. FIG. 10 shows the axial outward surface OS3 of the third sprocket SP3. FIG. 11 shows the axial inward surface IS3 of the third sprocket SP3.

As seen in FIGS. 10 and 11, the third sprocket SP3 has a plurality of shifting facilitation areas UFA31, UFA32, UFA33, DFA31, DFA32, and DFA33. In the illustrated embodiment, a total number of the plurality of shifting facilitation areas UFA31, UFA32, UFA33, DFA31, DFA32, and DFA33 is equal to six. However, some of the plurality of shifting facilitation areas UFA31, UFA32, UFA33, DFA31, DFA32, and DFA33 can be omitted. In such case, preferably, the total number of the plurality of shifting facilitation areas is a divisor of a total number of the plurality of sprocket attachment members 16. The plurality of the shifting facilitation areas UFA31, UFA32, UFA33, DFA31, DFA32, and DFA33 include at least one of at least one upshifting facilitation area UFA31, UFA32, and UFA33 and at least one downshifting facilitation area DFA31, DFA32, and DFA33. Specifically, the plurality of the shifting facilitation areas UFA31, UFA32, UFA33, DFA31, DFA32, and DFA33 include at least one upshifting facilitation area UFA31, UFA32, and UFA33 and at least one downshifting facilitation area DFA31, DFA32, and DFA33. The third sprocket SP3 can have the plurality of shifting facilitation areas (the sum of the at least one upshifting facilitation area UFA31, UFA32, and UFA33 and the at least one downshifting facilitation area DFA31, DFA32, and DFA33) which is not a divisor of the total number of the plurality of sprocket attachment members 16. In such case, it is preferable that the third sprocket SP3 can have a plurality of upshifting facilitation areas UFA31, UFA32, and UFA33 which is a divisor of the total number of the plurality of sprocket attachment members 16, and/or it is preferable that the third sprocket SP3 can have a plurality of downshifting facilitation areas DFA31, DFA32, and DFA33 which is a divisor of the total number of the plurality of sprocket attachment members 16. The upshifting facilitation areas UFA31, DFA32, and DFA33 have substantially the same structure as the upshifting facilitation areas UFA11, UFA12, and UFA13 of the first sprocket SP1, but their positions with respect to the plurality of the sprocket attachment members 16 are different from those of the upshifting facilitation areas UFA11, UFA12, and UFA13 of the first sprocket SP1. The downshifting facilitation areas DFA31, DFA32, and DFA33 have substantially the same structure as the downshifting facilitation areas DFA11, DFA12, and DFA13 of the first sprocket SP1, but their positions with respect to the plurality of the sprocket attachment members 16 are different from those of the downshifting facilitation areas DFA11, DFA12, and DFA13 of the first sprocket SP1. Thus, elements in shifting facilitation areas UFA31, UFA32, UFA33, DFA31, DFA32, and DFA33 having substantially the same function as those in shifting facilitation areas UFA11, UFA12, UFA13, DFA11, DFA12, and DFA13, respectively will be numbered the same here, and will not be described and/or illustrated again in detail here for the sake of brevity.

As seen in FIGS. 10 and 11, at least one of the plurality of shifting facilitation areas UFA31, UFA32, DFA33, DFA31, DFA32, and DFA33 is overlapped with one of the plurality of the sprocket attachment members 16. In other words, the at least one of the plurality of shifting facilitation areas UFA31, DFA32, DFA33, DFA31, DFA32, and DFA33 is overlapped with one of the plurality of the sprocket attachment members 16 as seen from the rotational center axis A1 of the third sprocket SP3. Further, as seen in FIGS. 10 and 11, the at least one of the plurality of shifting facilitation areas UFA31, UFA32, DFA33, DFA31, DFA32, and DFA33 is overlapped with one of the plurality of the sprocket attachment members 16 as seen along the rotational center axis A1. More specifically, each of the plurality of shifting facilitation areas UFA31, DFA32, DFA33, DFA31, DFA32, and DFA33 is overlapped with each of the plurality of the sprocket attachment members 16. In other words, each of the plurality of shifting facilitation areas UFA31, DFA32, DFA33, DFA31, DFA32, and DFA33 is overlapped with each of the plurality of the sprocket attachment members 16 as seen from the rotational center axis A1 of the third sprocket SP3. Further, as seen in FIGS. 10 and 11, each of the plurality of shifting facilitation areas UFA31, DFA32, DFA33, DFA31, DFA32, and DFA33 is overlapped with each of the plurality of the sprocket attachment members 16 as seen along the rotational center axis A1.

As seen in FIGS. 12 and 13, the fourth sprocket SP4 has a fourth pitch diameter L4. As seen in FIGS. 1 and 2, the fourth pitch diameter L4 is the fourth largest pitch-circle diameter in the bicycle rear sprocket assembly 10. In the illustrated embodiment, the total number of the plurality of fourth sprocket teeth T4 is equal to thirty-three. However, the total number of the plurality of fourth sprocket teeth T4 is not limited to the illustrated embodiment.

As seen in FIG. 2, the fourth sprocket SP4 has an axial outward surface OS4 and an axial inward surface IS4 which is a reverse surface of the axial outward surface OS4 along the rotational center axis A1 of the bicycle rear sprocket assembly 10. FIG. 12 shows the axial outward surface OS4 of the fourth sprocket SP4. FIG. 13 shows the axial inward surface IS4 of the fourth sprocket SP4.

As seen in FIGS. 12 and 13, the fourth sprocket SP4 has a plurality of shifting facilitation areas UFA41, UFA42, UFA43, DFA41, and DFA42. The plurality of the shifting facilitation areas UFA41, UFA42, UFA43, DFA41, and DFA42 include at least one of at least one upshifting facilitation area UFA41, UFA42, and UFA43 and at least one downshifting facilitation area DFA41 and DFA42. Specifically, the plurality of the shifting facilitation areas UFA41, UFA42, UFA43, DFA41, and DFA42 include at least one upshifting facilitation area UFA41, UFA42, and UFA43 and at least one downshifting facilitation area DFA41 and DFA42. The fourth sprocket SP4 has the plurality of shifting facilitation areas (the sum of the at least one upshifting facilitation area UFA41, UFA42, and UFA43 and the at least one downshifting facilitation area DFA41 and DFA42 which is not a divisor of the total number (six) of the plurality of sprocket attachment members 16. However, the fourth sprocket SP4 has a plurality of upshifting facilitation areas UFA41, UFA42, and UFA43 which is a divisor of the total number (six) of the plurality of sprocket attachment members 16, and the fourth sprocket SP4 has a plurality of downshifting facilitation areas DFA41 and DFA42 which is a divisor of the total number (six) of the plurality of sprocket attachment members 16. The upshifting facilitation areas UFA41, UFA42, and UFA43 have substantially the same structure as the upshifting facilitation areas UFA11, UFA12, and UFA13 of the first sprocket SP1, but their positions with respect to the plurality of the sprocket attachment members 16 are different from those of the upshifting facilitation areas UFA11, UFA12, and UFA13 of the first sprocket SP1. The downshifting facilitation areas DFA41 and DFA42 have substantially the same structure as the downshifting facilitation areas DFA11, DFA12, and DFA13 of the first sprocket SP1, but a total number of them and their positions with respect to the plurality of the sprocket attachment members 16 are different from those of the downshifting facilitation areas DFA11, DFA12, and DFA13 of the first sprocket SP1. Thus, elements in shifting facilitation areas UFA41, UFA42, and UFA43 having substantially the same function as those in shifting facilitation areas UFA11, UFA12, and UFA13, respectively will be numbered the same here, and will not be described and/or illustrated again in detail here for the sake of brevity. Elements in shifting facilitation areas DFA41 and DFA42 having substantially the same function as those in shifting facilitation areas DFA11, DFA12, and DFA13 will be numbered the same here, and will not be described and/or illustrated again in detail here for the sake of brevity.

As seen in FIGS. 12 and 13, at least one of the plurality of shifting facilitation areas UFA41, UFA42, UFA43, DFA41, and DFA42 is overlapped with one of the plurality of the sprocket attachment members 16. In other words, the at least one of the plurality of shifting facilitation areas UFA41, UFA42, UFA43, DFA41, and DFA42 is overlapped with one of the plurality of the sprocket attachment members 16 as seen from the rotational center axis A1 of the fourth sprocket SP4. Further, as seen in FIGS. 12 and 13, the at least one of the plurality of shifting facilitation areas UFA41, UFA42, UFA43, DFA41, and DFA42 is overlapped with one of the plurality of the sprocket attachment members 16 as seen along the rotational center axis A1. More specifically, each of the plurality of shifting facilitation areas UFA41, UFA42, UFA43, and DFA42 is overlapped with each of the plurality of the sprocket attachment members 16. In other words, each of the plurality of shifting facilitation areas UFA41, UFA42, UFA43, and DFA42 is overlapped with each of the plurality of the sprocket attachment members 16 as seen from the rotational center axis A1 of the fourth sprocket SP4. Further, as seen in FIGS. 12 and 13, each of the plurality of shifting facilitation areas UFA41, UFA42, UFA43, and DFA42 is overlapped with each of the plurality of the sprocket attachment members 16 as seen along the rotational center axis A1. However, at least one of the plurality of the shifting facilitation areas DFA41 is positioned between adjacent two of the plurality of sprocket attachment members 16. In other words, at least one of the plurality of the shifting facilitation areas DFA41 is positioned between adjacent two of the plurality of sprocket attachment members 16 in the circumferential direction D2.

Modifications

In the above embodiments, one of the upshifting facilitation areas and the downshifting facilitation areas can be omitted in each of the sprockets SP1 to SP8. In addition, the number of shifting facilitation areas in each of the sprockets SP1 to SP8 is not limited to the above embodiment.

Figure 18:
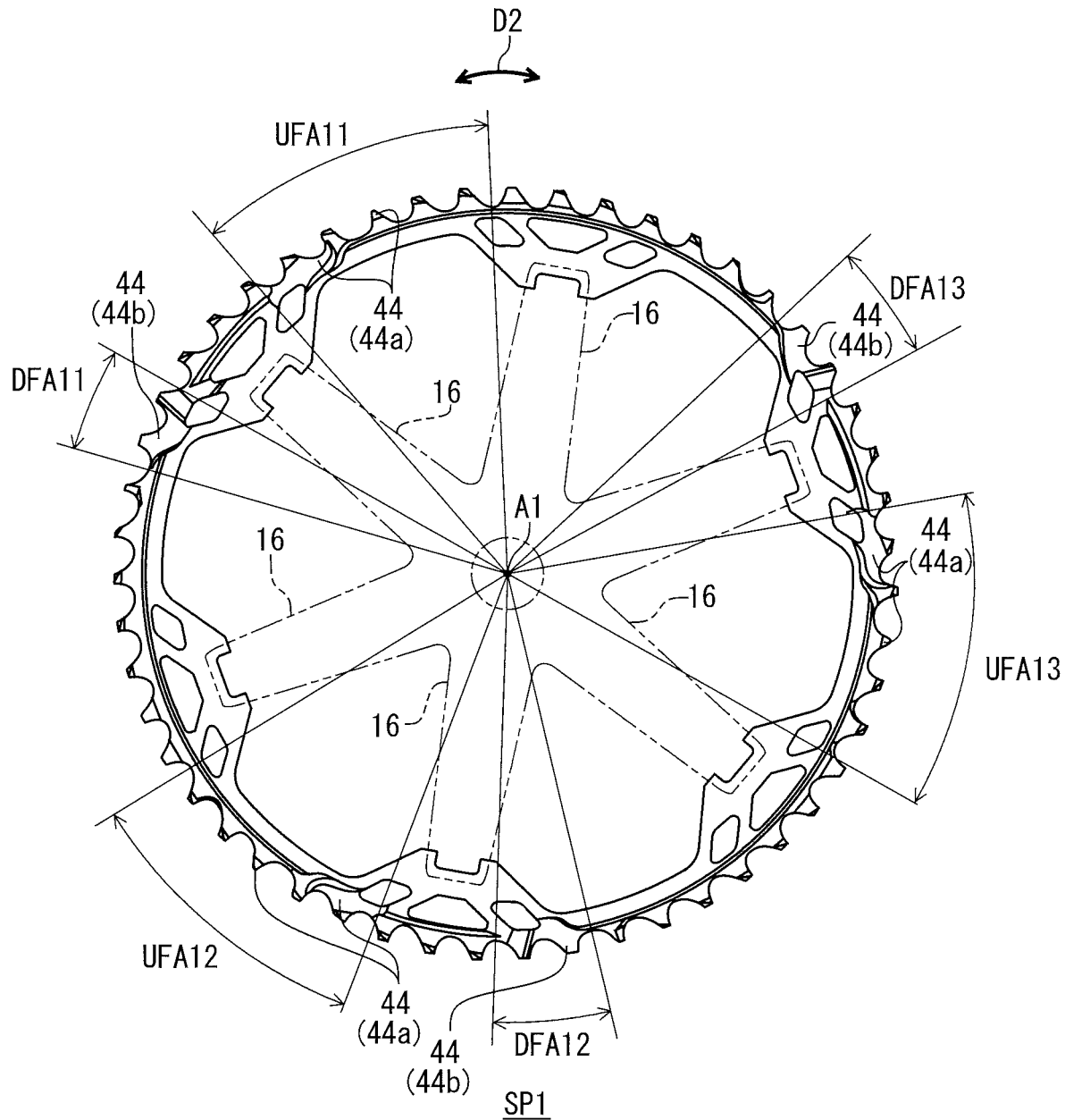
FIG. 18 illustrates a modification of the first sprocket illustrated in FIG. 6.

In each of the sprockets SP1 to SP3, at least one of the plurality of shifting facilitation areas UFA11, UFA12, UFA13, DFA11, DFA12, DFA13, UFA21, UFA22, UFA23, DFA21, DFA22, DFA23, UFA31, UFA32, UFA33, DFA31, DFA32, and DFA33 is positioned between adjacent two of the plurality of the sprocket attachment members 16. For example, as seen in FIG. 18, the first sprocket SP1 can have a shape in which at least one of the plurality of shifting facilitation areas UFA11, UFA12, UFA13, DFA11, DFA12, and DFA13 is positioned between adjacent two of the plurality of the sprocket attachment members 16. In other words, at least one of the plurality of shifting facilitation areas UFA11, UFA12, UFA13, DFA11, DFA12, and DFA13 is positioned between adjacent two of the plurality of the sprocket attachment members 16 as seen from the rotational center axis A1 of the first sprocket SP1. More specifically, each of the plurality of shifting facilitation areas UFA11, UFA12, UFA13, DFA11, DFA12, and DFA13 is positioned between adjacent two of the plurality of the sprocket attachment members 16. In other words, each of the plurality of shifting facilitation areas UFA11, UFA12, UFA13, DFA11, DFA12, and DFA13 is positioned between adjacent two of the plurality of the sprocket attachment members 16 as seen from the rotational center axis A1 of the first sprocket SP1.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle rear sprocket assembly comprising:
a sprocket support including a hub engagement part configured to engage with a bicycle hub assembly, the sprocket support including a plurality of support arms extending radially outwardly from the hub engagement part with respect to a rotational center axis of the bicycle rear sprocket assembly, the plurality of support arms having front surfaces and back surfaces, respectively, the back surfaces being opposite to the front surfaces in an axial direction along the rotational center axis, each of the plurality of support arms including one of a plurality of sprocket attachment members provided on each of the front surfaces, a total number of the plurality of sprocket attachment members being equal to or larger than six;
a first sprocket provided on the front surfaces of the plurality of sprocket support arms via the plurality of sprocket attachment members, the first sprocket including a first sprocket body and a plurality of first sprocket teeth which extend radially outwardly from the first sprocket body with respect to the rotational center axis and a total number of which is equal to or larger than thirty-four, the first sprocket having a plurality of shifting facilitation areas, a total number of the plurality of shifting facilitation areas being a divisor of a total number of the plurality of sprocket attachment members, the first sprocket having a first pitch-circle diameter that is a largest pitch-circle diameter in the bicycle rear sprocket assembly; and
a second sprocket provided on the front surfaces of the plurality of sprocket support arms via the plurality of sprocket attachment members, the second sprocket including a second sprocket body and a plurality of second sprocket teeth extending radially outwardly from the second sprocket body with respect to the rotational center axis.

2. The bicycle rear sprocket assembly according to claim 1, wherein
a total number of the plurality of sprocket attachment members being equal to six, and
the first sprocket having three or six shifting facilitation areas.

3. The bicycle rear sprocket assembly according to claim 1, wherein
the shifting facilitation areas include at least one of at least one upshifting facilitation area and at least one downshifting facilitation area.

4. The bicycle rear sprocket assembly according to claim 1, wherein
the first sprocket is attached to the plurality of sprocket attachment members via adhesive.

5. The bicycle rear sprocket assembly according to claim 1, wherein
at least one of the plurality of sprocket attachment members includes a first radial support surface and a first axial support surface,
the first radial support surface faces radially outwardly, the first axial support surface faces in the axial direction, and
the first sprocket is attached to the first radial support surface and the first axial support surface.

6. The bicycle rear sprocket assembly according to claim 1, wherein
the sprocket support is made of resin.

7. The bicycle rear sprocket assembly according to claim 1, wherein
the first sprocket is made of a metallic material.

8. The bicycle rear sprocket assembly according to claim 7, wherein
the first sprocket is made of aluminum.

9. The bicycle rear sprocket assembly according to claim 1, further comprising:
a third sprocket including a third sprocket body and a plurality of third sprocket teeth extending radially outwardly from the third sprocket body with respect to the rotational center axis; and
a fourth sprocket including a fourth sprocket body and a plurality of fourth sprocket teeth extending radially outwardly from the fourth sprocket body with respect to the rotational center axis.

10. The bicycle rear sprocket assembly according to claim 9, wherein
the third sprocket, and the fourth sprocket are attached to the plurality of sprocket attachment members.

11. The bicycle rear sprocket assembly according to claim 1, wherein
the hub engagement part includes at least one spline configured to engage with the bicycle hub assembly.

12. The bicycle rear sprocket assembly according to claim 3, wherein
the first sprocket has an axial outward surface and an axial inward surface which is a reverse surface of the axial outward surface along the rotational center axis of the bicycle rear sprocket assembly,
first axial recesses are provided on the axial outward surface in the shifting facilitation areas, and
at least one second axial recess is provided on the axial inward surface in the at least one upshifting facilitation area.

13. The bicycle rear sprocket assembly according to claim 1, wherein
at least one of the plurality of shifting facilitation areas is overlapped with one of the plurality of sprocket attachment members.

14. The bicycle rear sprocket assembly according to claim 13, wherein
each of the plurality of shifting facilitation areas is overlapped with each of the plurality of sprocket attachment members.

15. The bicycle rear sprocket assembly according to claim 1, wherein
at least one of the plurality of shifting facilitation areas is positioned between adjacent two of the plurality of sprocket attachment members.

16. The bicycle rear sprocket assembly according to claim 15, wherein
each of the plurality of shifting facilitation areas is positioned between adjacent two of the plurality of sprocket attachment members.

17. The bicycle rear sprocket assembly according to claim 1, wherein
the sprocket support is a separate member from the first sprocket.

18. The bicycle rear sprocket assembly according to claim 1, wherein
the sprocket support is a one-piece unitary member.

* * * * *